US008162733B2

(12) United States Patent
Yoshizawa

(10) Patent No.: US 8,162,733 B2
(45) Date of Patent: Apr. 24, 2012

(54) SLOT MACHINE

(75) Inventor: Kazumasa Yoshizawa, Tokyo (JP)

(73) Assignee: Universal Entertainment Corporation, Tokyo (JP)

( * ) Notice: Subject to any disclaimer, the term of this patent is extended or adjusted under 35 U.S.C. 154(b) by 458 days.

(21) Appl. No.: 12/402,175

(22) Filed: Mar. 11, 2009

(65) Prior Publication Data

US 2009/0233691 A1 Sep. 17, 2009

Related U.S. Application Data

(60) Provisional application No. 61/035,621, filed on Mar. 11, 2008.

(51) Int. Cl.
*A63F 9/24* (2006.01)
*G06F 17/00* (2006.01)

(52) U.S. Cl. ................ 463/10; 463/12; 463/16; 463/17; 463/19; 463/20

(58) Field of Classification Search .............. 463/10–13, 463/16–21
See application file for complete search history.

(56) References Cited

U.S. PATENT DOCUMENTS

2007/0060378 A1 3/2007 Nelson et al.
2008/0076522 A1 * 3/2008 Okada .............................. 463/20

* cited by examiner

*Primary Examiner* — Hsien Ming Lee
(74) *Attorney, Agent, or Firm* — NDQ&M Watchstone LLP

(57) ABSTRACT

When a free game is finished, a chance game that determines whether or not the free game is executed again is executed. In the chance game, if the number of re-trigger symbols in a symbol display frame 111 of a liquid crystal panel 5B is a predetermined number or more, it is determined that the free game is executed again. In this determination, the number of execution times of a unit game of the free game that is executed again is determined according to the number of the re-trigger symbols.

8 Claims, 15 Drawing Sheets

FIG. 3

| CODE NUMBER | EACH VIDEO REEL |
|---|---|
| 21 | FRANKENSTEIN |
| 20 | BELL |
| 19 | APPLE |
| 18 | BELL |
| 17 | CHERRY |
| 16 | ORANGE |
| 15 | PLUM |
| 14 | CHERRY |
| 13 | BELL |
| 12 | APPLE |
| 11 | BELL |
| 10 | ORANGE |
| 09 | PLUM |
| 08 | BLUE 7 |
| 07 | BELL |
| 06 | APPLE |
| 05 | BELL |
| 04 | PLUM |
| 03 | PLUM |
| 02 | CHERRY |
| 01 | BELL |
| 00 | APPLE |

| SCATTERS |  |  |  |  |  |  |  |
|---|---|---|---|---|---|---|---|
| ANY15 | 500 | 250 | 250 | 50 | 50 | 20 | 20 |
| ANY14 | 300 | 200 | 40 | 20 | 20 | 15 | 15 |
| ANY13 | 200 | 100 | 20 | 15 | 15 | 10 | 10 |
| ANY12 | 100 | 40 | 10 | 10 | 4 | 4 | 4 |
| ANY11 | 40 | 10 | 4 | 4 | 2 | 2 | 2 |
| ANY10 | 10 | 4 | 4 | 2 | 1 | 1 | 1 |
| ANY9 | 4 | 2 | 1 | 1 | — | — | — |

| SCATTERS |  |
|---|---|
| ANY15 | FREE GAMES AGAIN 5 TIMES |
| ANY14 | FREE GAMES AGAIN 4 TIMES |
| ANY13 | FREE GAMES AGAIN 3 TIMES |
| ANY12 | FREE GAMES AGAIN 2 TIMES |
| ANY11 | FREE GAMES AGAIN 1 TIME |

SLOT MACHINE

CROSS-REFERENCE TO RELATED APPLICATIONS

This application is based upon and claims a priority from the U.S. Provisional Patent Application No. 61/035,621 filed on Mar. 11, 2008, the entire contents of which are incorporated herein by reference.

BACKGROUND OF THE INVENTION

1. Field of the Invention

The present invention relates to a slot machine in which a free game can be executed.

2. Description of Related Art

As is disclosed in U.S. Patent 2007/0060378A1, for example, when a trigger combination is realized in a slot game, a free game is started. In the free game, slot games are executed continuously for a predetermined number of times.

In some free games, a new free game is started when a trigger combination is realized again during the free game. In such free games, probability or realization conditions for realizing a trigger combination again during the free game is same as the slot game.

Therefore, a new free game is substantially same as the free game which has been executed right before a start of the new game.

SUMMARY

The present invention has been conceived in view of the above circumstance and an object of the present invention is to provide an unprecedented novel slot machine which executes a chance game for determining whether or not a free game is continuously executed after the free game is finished.

To achieve the object of the present invention, there is provided a slot machine comprising: a plurality of re-trigger symbols; a plurality kinds of symbols including the re-trigger symbols; a symbol group comprising the symbols; a symbol matrix frame where one of the symbols is arranged on each point which is formed by crossing a plurality of horizontal lines and a plurality of vertical columns; a display device for displaying the symbol matrix frame; a unit game in which a prize is awarded to a player based on the symbol displayed in the symbol matrix frame on the display device; a base game comprising each of the unit games; a free game in which the unit game is repeated for a first predetermined number of times; a chance game which is executed for determining whether or not the free game is executed again; a processor programmed, for executing the free game, to execute each of processes from the process of (1) below to the process of (17) below: (1) selecting some of the symbols from the symbol group at random and displaying by a scrolling manner the symbols in the matrix frame along each of the column upon starting the unit game of the base game; (2) displaying on the display device each of the symbols selected in the process of (1) above in a state that each symbol is rearranged on each point in the symbol matrix frame; (3) shifting a game mode from the base game to the free game upon rearranging a predetermined number or more than the predetermined number of symbols of the same kind continuously on any line in the symbol matrix frame; (4) arranging the predetermined number or more than the predetermined number of symbols of the same kind that are continuously rearranged on any lines in the symbol matrix frame on the lines other than the any lines in the symbol matrix frame continuously, and whereby increasing and rearranging symbols of the same kind, upon shifting the game mode to the free game; (5) starting to repeat the unit game of the free game for the first predetermined number of times on a condition that a state, in which the predetermined number or more than the predetermined number of symbols of the same kind that are rearranged continuously on any lines in the symbol matrix frame, is fixedly maintained; (6) selecting some of the symbols from the symbol group at random upon starting the current unit game in the free game; (7) displaying on the display device a state that each of the symbols selected in the process of (6) above is being rearranged on each point in the symbol matrix frame other than the points where the same kinds of symbols are fixed; (8) awarding a player a prize which corresponded to both a total number of the number of the same kinds of symbols being fixed in the symbol matrix frame and the number of the same kinds of symbols rearranged in the symbol matrix frame, and finishing the current unit game in the free game; (9) determining whether or not the unit game of the free game is repeated continuously for the first predetermined number of times; (10) when it is determined that the unit game of the free game is not repeated continuously for the first predetermined number of times, starting a new unit game in the free game and returning to the process of (6) above; (11) when it is determined that the unit game of the free game is repeated continuously for the first predetermined number of times, starting to repeat the chance game for a second predetermined number of times on a condition that a state, in which the re-trigger symbols are in the symbol matrix frame, is fixedly maintained; (12) displaying on the display device a state that each symbol is being rearranged on each point other than the points where the re-trigger symbols are fixed in the symbol matrix frame upon starting the chance game; (13) notifying, by both a total number of the number of the re-trigger symbols that are being fixed in the symbol matrix frame and the number of the re-trigger symbols that are being rearranged in the symbol matrix frame, that the free game is continued or that the free game is not continued; (14) executing the free game again when it is notified that the free game is continued; (15) determining whether or not the chance game is repeated for the second predetermined number of times when it is notified that the free game is not continued; (16) when it is determined that the chance game is not repeated continuously for the second predetermined number of times, starting the chance game newly and returning to the process of (12) above; and (17) when it is determined that the chance game is repeated continuously for the second predetermined number of times, finishing the free game and shifting the game mode from the free game to the base game.

Furthermore, according to another aspect of the present invention, there is provided a slot machine comprising: a plurality of re-trigger symbols; a plurality kinds of symbols including the re-trigger symbols; a wild symbol included in the symbols and being able to be substituted for all kinds of symbols; a symbol group comprising the symbols; a symbol matrix frame where one of the symbols is arranged on each point which is formed by crossing a plurality of horizontal lines and a plurality of vertical columns; a display device for displaying the symbol matrix frame; a unit game in which a prize is awarded to a player based on the symbol displayed in the symbol matrix frame on the display device; a base game comprising each of the unit games; a free game in which the unit game is repeated for a first predetermined number of times; a chance game which is executed for determining whether or not the free game is executed again; a processor programmed, for executing the free game, to execute each of processes from the process of (1) below to the process of (17)

below: (1) selecting some of the symbols from the symbol group at random and displaying by a scrolling manner the symbols in the matrix frame along each of the column upon starting the unit game of the base game; (2) displaying on the display device each of the symbols selected in the process of (1) above in a state that each symbol is rearranged on each point in the symbol matrix frame; (3) shifting a game mode from the base game to the free game upon rearranging a predetermined number or more than the predetermined number of symbols of the same kind continuously on any line in the symbol matrix frame; (4) arranging the predetermined number or more than the predetermined number of symbols of the same kind that are continuously rearranged on any lines in the symbol matrix frame on the lines other than the any lines in the symbol matrix frame continuously, and whereby increasing and rearranging symbols of the same kind, upon shifting the game mode to the free game; (5) starting to repeat the unit game of the free game for the first predetermined number of times on a condition that a state, in which the predetermined number or more than the predetermined number of symbols of the same kind that are being rearranged continuously on any lines in the symbol matrix frame are replaced with the wild symbols, is fixedly maintained; (6) selecting some of the symbols from the symbol group at random upon starting the current unit game in the free game; (7) displaying on the display device a state that each of the symbols selected in the process of (6) above is being rearranged on each point in the symbol matrix frame other than the points where the wild symbols are fixed; (8) awarding a player a prize which corresponded to both a total number of the number of the wild symbols being fixed in the symbol matrix frame and the number of the same kinds of symbols rearranged in the symbol matrix frame, and finishing the current unit game in the free game; (9) determining whether or not the unit game of the free game is repeated continuously for the first predetermined number of times; (10) when it is determined that the unit game of the free game is not repeated continuously for the first predetermined number of times, starting a new unit game in the free game and returning to the process of (6) above; (11) when it is determined that the unit game of the free game is repeated continuously for the first predetermined number of times, starting to repeat the chance game for a second predetermined number of times on a condition that a state, in which the wild symbols in the symbol matrix frame are changed to the re-trigger symbols, is fixedly maintained; (12) displaying on the display device a state that each symbol is being rearranged on each point other than the points where the re-trigger symbols are fixed in the symbol matrix frame upon starting the chance game; (13) notifying, by both a total number of the number of the re-trigger symbols that are being fixed in the symbol matrix frame and the number of the re-trigger symbols that are being rearranged in the symbol matrix frame, that the free game is continued or that the free game is not continued; (14) executing the free game again when it is notified that the free game is continued; (15) determining whether or not the chance game is repeated for the second predetermined number of times when it is notified that the free game is not continued; (16) when it is determined that the chance game is not repeated continuously for the second predetermined number of times, starting the chance game newly and returning to the process of (12) above; and (17) when it is determined that the chance game is repeated continuously for the second predetermined number of times, finishing the free game and shifting the game mode from the free game to the base game.

BRIEF DESCRIPTION OF THE DRAWINGS

FIG. 3 is a schematic view showing symbol columns drawn on reel band of each reel;

DETAILED DESCRIPTION

[1. Characteristics of the Present Invention]

Figure 1:
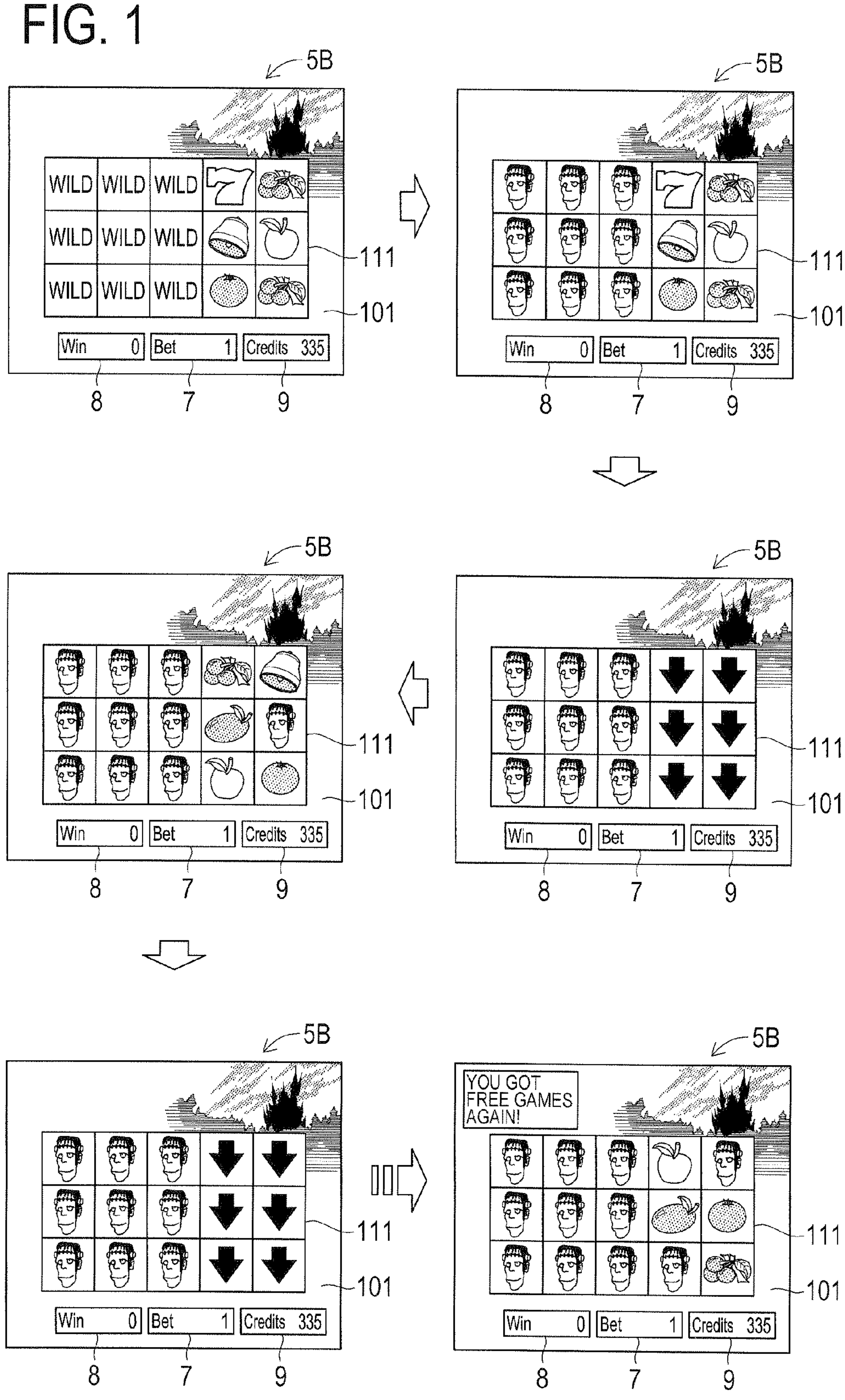
FIG. 1 is a view showing characteristics of a slot machine which is one embodiment of the present invention.
Figure 9:
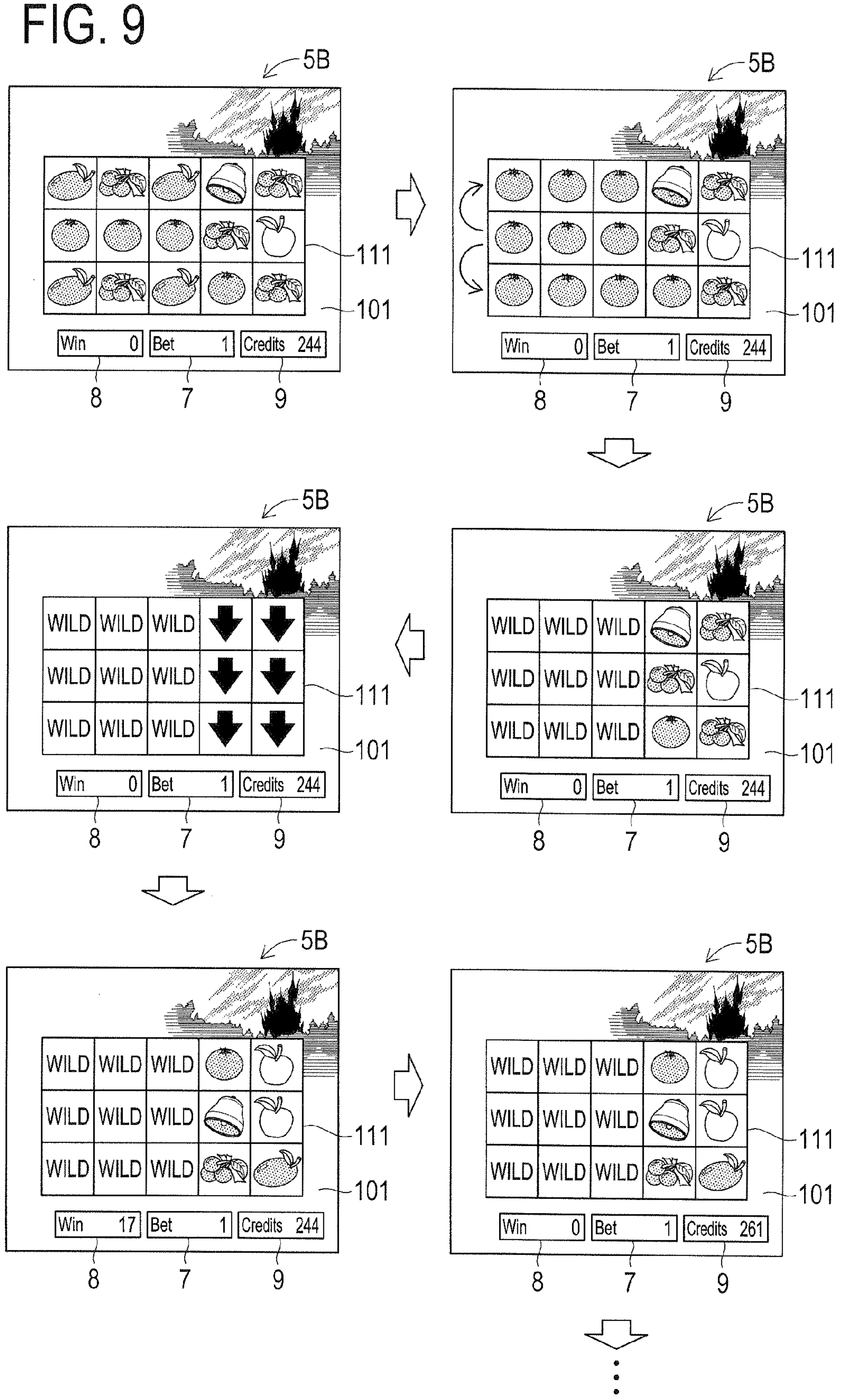
FIG. 9 is a view showing characteristics of a slot machine which is one embodiment of the present invention.

FIG. 1 and FIG. 9 are a view showing characteristics of a slot machine which is one embodiment of the present invention. Incidentally, when a liquid crystal panel 5B shown on FIG. 1 or FIG. 9 is specified, the specified liquid crystal panel 5B is described by the number of stages which counted from the uppermost stage in FIG. 1 or FIG. 9. In explanation of FIG. 18 below, the liquid crystal panel 5B is specified in a similar manner.

In the slot machine according to the present embodiment, a slot game using scatter symbols is executed as a base game. If a player wins a bonus game trigger in a slot game, a free game, in which a slot game same as above repeats automatically the first predetermined number, is executed.

In the slot game, as shown on FIG. 1 and FIG. 9, a symbol display frame 111 displaying fifteen symbols is displayed on the well-known liquid crystal panel 5B. The fifteen symbols are arranged in a matrix comprising three rows by five columns. In this respect, within the symbol display frame 111, fifteen symbol display areas, where one of many symbols drawn on a reel band of one video reel is arranged, are positioned like a matrix comprising three rows by five columns. That is, in the symbol display frame 111, the symbol display areas are formed so as to surround each point which is obtained by crossing horizontal three lines and vertical five columns. Further, one symbol display area is assigned to each of the fifteen video reels. Then, one of the symbols drawn on the reel band of each video reels is arranged in each of the symbol display areas. Further, the liquid crystal panel 5B has a bet amount display portion 7, a payout amount display portion 8 and a credit amount display portion 9. In addition, a touch panel 101 is provided on the front face of the liquid crystal panel 5B.

In the meantime, various winning combinations are previously determined based on the number of the same symbol. When each of the video reels is scrolled and stopped, a symbol is rearranged one by one in each of the symbol display areas of the symbol display frame 111. At this time, when the fifteen symbols that are rearranged in the symbol display frame 111 compose any one of the winning combinations, the payout amount is computed based on the winning combination composed and the bet amount indicated by a player. The payout amount is awarded to the player by displaying the payout amount in the payout amount display portion 8. Incidentally, the bet amount which is indicated by a player is displayed in the bet amount display portion 7. Additionally, the payout amount displayed on the payout amount display portion 8 is added to the amount in the credit amount display portion 9, and the added amount is displayed in the credit amount display portion 9.

With this, a unit game which is repeated in a base game or a free game is configured. It is to be noted that a base game and a unit game may be described as a slot game for easy explanation.

In the slot machine according to the present embodiment, when three or more than three same symbols are rearranged on any line of the symbol display areas in the symbol display frame 111 of the liquid crystal panel 5B continuously from the leftmost symbol display area during a base game, the base game is shifted to a free game. Specifically, in the example shown on the liquid crystal panel 5B shown on the left side in the upper stage of FIG. 9, three symbols of "ORANGE" are rearranged on the middle line of the symbol display areas in the symbol display frame 111 continuously from the leftmost symbol display area.

A combination of the three or more than three same symbols that are rearranged on any line of the symbol display areas in the symbol display frame 111 of the liquid crystal panel 5B continuously from the leftmost symbol display area is hereinafter referred to as a "trigger combination". In the example shown on the liquid crystal panel 5B shown on the left side in the upper stage of FIG. 9, the combination of the three symbols of "ORANGE" that are rearranged on the middle line of the symbol display areas in the symbol display frame 111 continuously from the leftmost symbol display area corresponds to the "trigger combination".

Then, the "trigger combination" that is rearranged on any line of the symbol display areas in the symbol display frame 111 of the liquid crystal panel 5B is displayed from the leftmost symbol display area on all the lines other than the lines where the "trigger combination" has been rearranged already. Specifically, in the example shown on the liquid crystal panel 5B shown on the right side in the upper stage of FIG. 9, the combination of the three symbols of "ORANGE" that are rearranged on the middle line of the symbol display areas in the symbol display frame 111 continuously from the leftmost symbol display area is displayed from the leftmost symbol display area on the upper line and the lower line of the symbol display areas in the symbol display frame 111.

Further, in the symbol display frame 111 of the liquid crystal panel 5B, each symbol forming the "trigger combination" that is being rearranged and each symbol forming the "trigger combination" that is being displayed are changed to a wild symbol, respectively, and the wild symbols are displayed. Specifically, in the example shown on the liquid crystal panel 5B shown on the right side in the middle stage of FIG. 9, the three symbols of "ORANGE" that are rearranged on the middle line of the symbol display areas in the symbol display frame 111 continuously from the leftmost symbol display area are changed to the wild symbols, and the wild symbols are displayed. The three symbols of "ORANGE" that are displayed on the upper line and the lower line of the symbol display areas in the symbol display frame 111 continuously from the leftmost symbol display area are changed to the wild symbols, and the wild symbols are displayed.

Then, all the wild symbols that are displayed in the symbol display frame 111 of the liquid crystal panel 5B will be continuously displayed during the free game. With this state, each unit game of the free game is repeated. In other words, as shown on the liquid crystal panel 5B shown on the right side in the middle stage of FIG. 9, in the symbol display frame 111 of the liquid crystal panel 5B during the free game, a video reel is repeatedly displayed by a scrolling manner and by a stopped manner only in the symbol display areas where no wild symbol is displayed. In this respect, the wild symbols can be substituted for all kinds of symbols. Therefore, in each unit game of the free game, for any kinds of symbols, a plurality of same symbols are necessarily rearranged in the symbol display frame 111 of the liquid crystal panel 5B.

In the example shown in FIG. 9, every time each unit game of the free game is executed, nine same symbols are necessarily rearranged for all kinds of symbols. Therefore, different winning combinations are likely to be realized, simultaneously. Specifically, in the example shown on the liquid crystal panel 5B shown on both sides in the lower stage of FIG. 9, each winning combination is realized at the same time for all kinds of symbols (refer to FIG. 6).

Incidentally, even if the number of the same symbols that are being rearranged in the symbol display frame 111 of the liquid crystal panel 5B is nine or less, there may be a kind of the symbol that corresponds to any one of the winning combinations. In such a case, such a winning combination is realized every time each unit game of the free game is executed as shown in the example of FIG. 9. Such a winning combination may be previously eliminated.

In the slot machine according to the present embodiment, when the free game is finished, a chance game is executed for determining whether or not the free game is executed again. In this chance game, if the number of re-trigger symbols that are rearranged in the symbol display frame 111 of the liquid crystal panel 5B is a predetermined number or more, it is determined that the free game is executed again. In this determination, the number of times of executing the unit game of the free game that is executed again is determined according to the number of the re-trigger symbols (refer to FIG. 10). The chance game is repeated for a second predetermined number of times. However, when it is determined that the free game is executed again, the chance game is finished immediately and the chance game is shifted to the free game again.

In the chance game, when the free game is shifted to the chance game, all the wild symbols being displayed in the symbol display frame 111 are changed to the re-trigger symbols (here, the symbols of "FRANKENSTEIN"), and the re-trigger symbols are displayed as shown on the liquid display panel 5B shown on both sides in the upper stage of FIG. 1.

Then, all the re-trigger symbols (symbols of "FRANKENSTEIN") that are being displayed in the symbol display frame 111 of the liquid crystal panel 5B will be continuously displayed during the chance game. With this state, each unit game of the free game is repeated. In other words, in the symbol display frame 111 of the liquid crystal panel 5B during the chance game, the video reel is displayed by a scrolling manner and by a stopped manner only in the symbol display areas where no re-trigger symbol (the symbol of "FRANKENSTEIN") is displayed, as shown on the liquid crystal panel 5B shown on the right side in the middle stage of FIG. 1. Therefore, in the chance game, a plurality of re-trigger symbols (the symbols of "FRANKENSTEIN") are necessarily rearranged in the symbol display frame 111 of the liquid crystal panel 5B.

Specifically, in the example shown on the liquid crystal panel 5B shown on both sides in the middle stage and the lower stage of FIG. 1, every time the chance game is executed, nine re-trigger symbols (the symbols of "FRANKENSTEIN") are necessarily rearranged in the symbol display frame 111 of the liquid crystal panel 5B. Therefore, it is likely to be determined that the free game is executed again.

In the example of the chance game shown on the liquid crystal panel 5B shown on both sides in the middle stage portions of FIG. 1, nine re-trigger symbols (the symbols of "FRANKENSTEIN") are being displayed in the symbol display frame 111 and one re-trigger symbol (the symbol of "FRANKENSTEIN") is being rearranged in the symbol display frame 111. Therefore, the ten re-trigger symbols (the symbols of "FRANKENSTEIN") are rearranged in the symbol display frame 111. In this embodiment, ten is not the number for the determination that the free game is executed again (refer to FIG. 10).

In the example of the chance game that is executed thereafter, as shown on the liquid crystal panel 5B shown on both sides in the lower stage of FIG. 1, nine re-trigger symbols (the symbols of "FRANKENSTEIN") are being displayed in the symbol display frame 111, and two re-trigger symbols (the symbols of "FRANKENSTEIN") are being rearranged in the symbol display frame 111. Therefore, eleven re-trigger symbols (the symbols of "FRANKENSTEIN") are rearranged in the symbol display frame 111. In this respect, in the present embodiment, eleven is the number for the determination that the free game comprising one unit game is executed again (refer FIG. 10).

Incidentally, if the number of all re-trigger symbols (the symbols of "FRANKENSTEIN") that have changed from the wild symbols and displayed in the symbol display frame 111 of the liquid crystal panel 5B is equal to the number for the determination that the free game is executed again, it has been already determined that the free game is executed when the free game is shifted to the chance game, that is, before the chance game is executed.

[2. Construction of the Slot Machine]

Hereinafter, the one embodiment embodying the present invention will be explained in detail with reference to the drawings.

Figure 2:
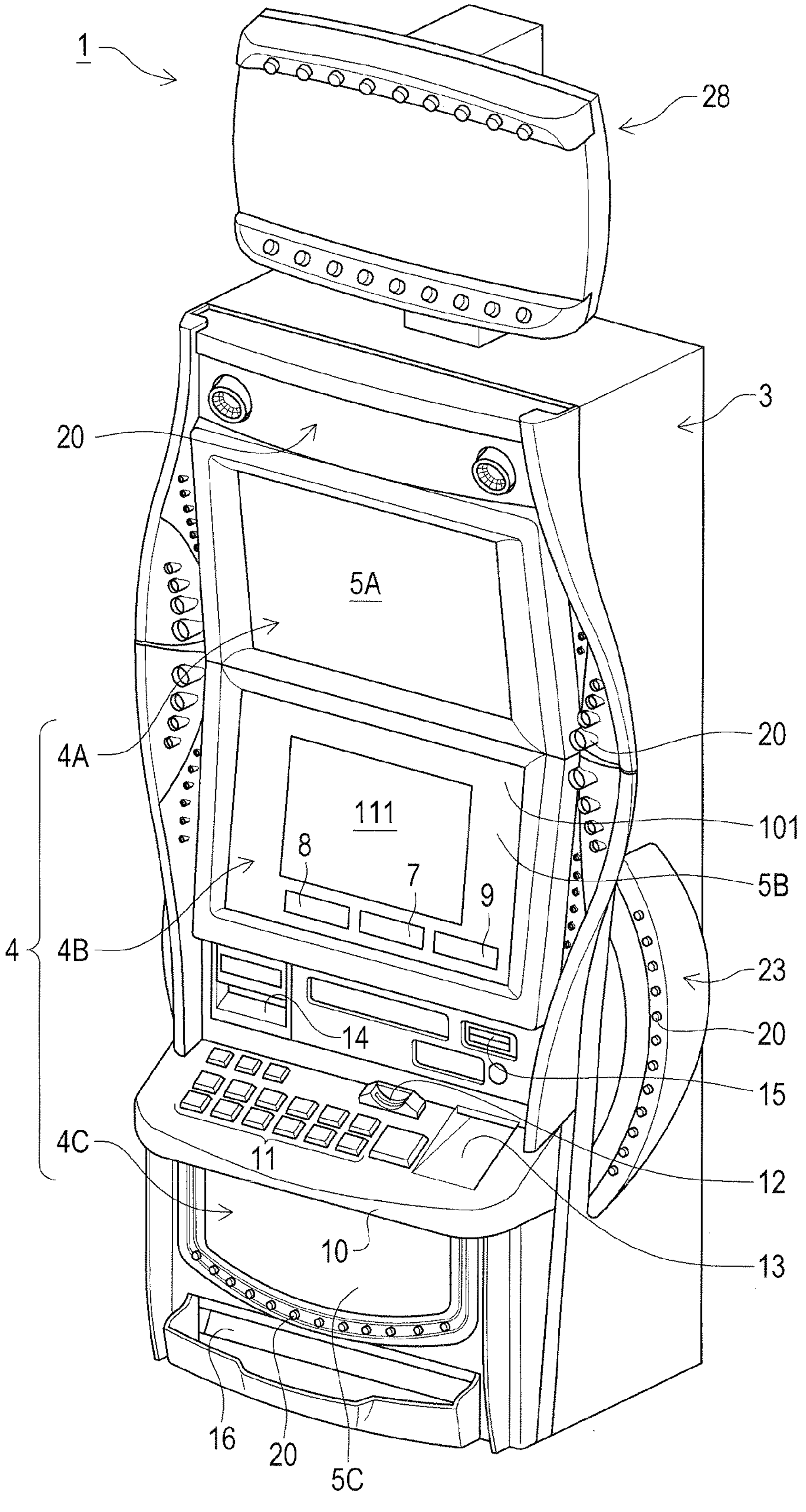
FIG. 2 is a perspective view of the slot machine.

First, an outline construction of the slot machine 1 according to the present embodiment will be explained with reference to FIG. 2. FIG. 2 is a perspective view of the slot machine 1 according to the present embodiment.

As shown in FIG. 2, the slot machine 1 is an upright type slot machine arranged in a game arcade such as casino, in order to execute predetermined game modes, such slot machine includes a cabinet 3 in which electronic and mechanical components are installed. For example, as a display portion 4 to display information concerning a game, there are provided an upper display portion 4A, a middle variable display portion 4B and a lower display portion 4C. Each display portion 4A to 4C is mounted at the front of the oblong cabinet 3. The upper display portion 4A includes a liquid crystal panel 5A which is arranged above the middle variable display portion 4B. On the liquid crystal panel 6A, for example, an effect image, an introduction of a game content, and a rule explanation of a game are displayed. The lower display portion 4C is arranged below the middle variable display portion 4B, and includes a plastic panel 5C on which images are printed, and a plastic panel 5C is lightened by backlights.

The middle variable display portion 4B, which is used to display an execution state of a game, includes the liquid crystal panel 5B which is fixed at the front door of the cabinet 3. In this liquid crystal panel 5B, fifteen symbols of the video reels are displayed in a scrolling manner and in a stopped manner, respectively. In the middle variable display portion 4B, the symbol display frame 111 in which the fifteen symbol display areas associated with each video reel are positioned like a matrix of three rows times five columns is displayed on the liquid crystal panel 5B. Further, the touch panel 101 is provided on the front surface of the liquid crystal panel 5B. On the lower position of the middle variable display portion 4B, the bet amount display portion 7, the payout amount display portion 8 and the credit amount display portion 9 are arranged on the liquid crystal panel 5B. Also the upper portion of the middle variable display portion 4B, is related to the back side, thereby a player may play a game in a cozy posture.

Figure 7:
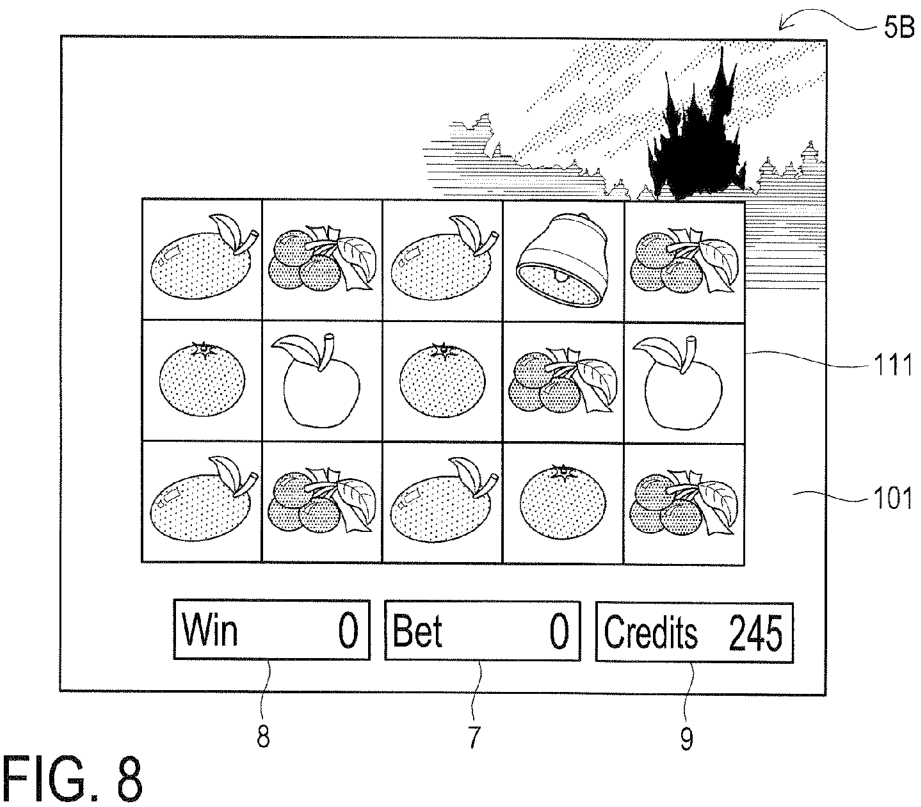
FIG. 7 is a view showing one of an image displayed on a liquid crystal panel.
Figure 8:
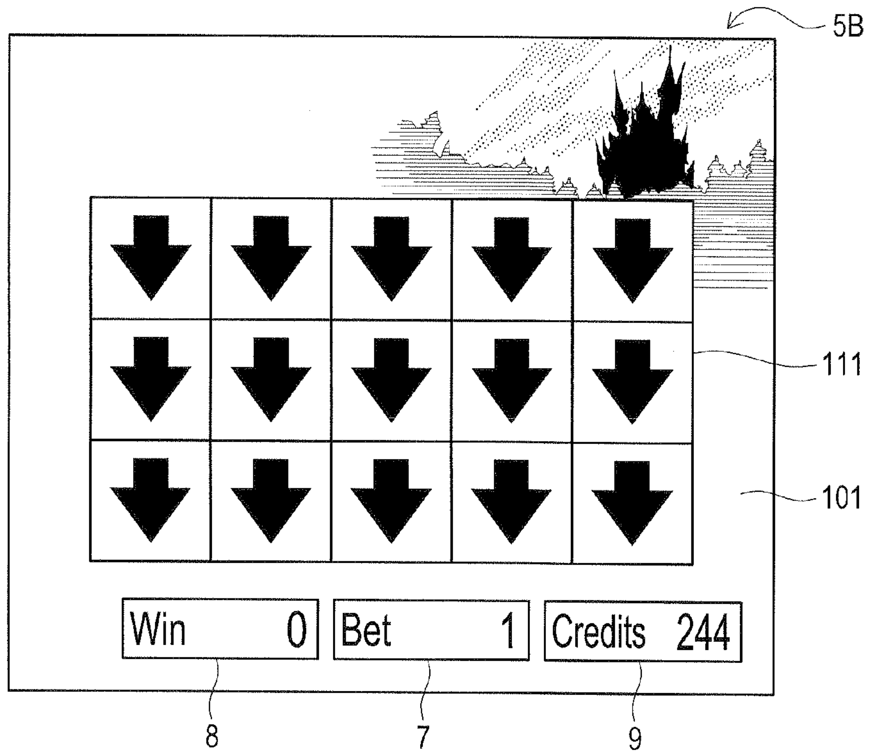
FIG. 8 is a view showing one of an image displayed on the liquid crystal panel.

Now, images of a slot game to be displayed on the liquid crystal panel 5B and images of a free game to be displayed on the liquid crystal panel 5B are explained. FIG. 7 and FIG. 8 are drawings showing contents displayed on the liquid crystal panel 5B, as one example of images to be displayed on the liquid crystal panel 5B. As shown in FIG. 7 and FIG. 8, on the liquid crystal panel 5B in a slot game or in a free game, the symbol drawn on the reel band of each video reel is displayed in the fifteen symbol display areas positioned like a matrix of three rows times five columns in the symbol display frame 111, so that they can be viewed by a player. FIG. 7 shows a state in which the symbol drawn on the reel band of each video reel is arranged or rearranged in each symbol display area of the symbol display frame 111 on the liquid crystal panel 5B. FIG. 8 shows a state in which the symbol drawn on the reel band of each video reel is displayed by a scrolling manner in each symbol display area of the symbol display frame 111 on the liquid crystal panel 5B. Incidentally, on the reel band of each video reel, a symbol column constructed from twenty-two symbols is drawn respectively (refer to FIG. 3).

Further, the bet amount display portion 7, the payout amount display portion 8 and the credit amount display portion 9 are arranged on the liquid crystal panel 5B. On the bet amount display portion 7, the bet amount which is indicated by the current player is displayed. On the payout amount display portion 8, the payout amount awarded in a slot game to a player is displayed. On the credit amount display portion 9, the credit amount which is owned by the current player is displayed.

Therefore, on the liquid crystal panel 5B in a slot game or in a free game, one symbol which is drawn on the reel band of each video reel is arranged in each of the fifteen symbol display areas of the symbol display frame 111.

Returning to FIG. 2, between the middle variable display portion 4B and the lower display portion 4C, at the front of the cabinet 3, an operation table 10 which is projected forward is arranged. On the operation table 10, a variety of operation buttons 11 including a BET button, a collecting button, a spin button and a CASHOUT button are arranged as an operation portion to execute a game. On the operation table 10, a coin insertion slot 12 and a bill insertion slot 13 are arranged. Also between the operation table 10 and the middle variable display portion 4B, a ticket printer 14, a card reader 15 and a reader/writer 15 are arranged. At the lowest position of the cabinet 3, a coin tray 16 is also arranged.

Incidentally, in the slot machine 1 of the present embodiment, gaming medium may be coin, bill, or electronic value (credit). Here, the gaming medium may be others as well, such as medal, token, electronic money, or ticket.

Further, on the cabinet 3 of the slot machine 1, light emitting portions 20 are arranged around a game area including the upper display portion 4A, the middle variable display portion 4B, the lower display portion 4C and the operation table 10.

Furthermore, the slot machine 1 also includes a topper effect device 28 which is installed on the cabinet 3. The topper effect device 28 is shaped in a rectangular board shaped, and is arranged almost parallel to the liquid crystal panel 5A of the upper display portion 4A. The cabinet 3 is further provided with speakers 23 on its both sides.

[3. Outline of Symbols]

Next, the symbols drawn on the reel band of each video reel will be explained with reference to FIG. 3. These symbols are scrolled and rearranged in the respective symbol display areas of the symbol display frame 111 on the liquid crystal panel 5B in a slot game or a chance game. FIG. 3 is a schematic view showing symbol columns drawn on the reel band of each video reel.

On the reel band of each video reel, twenty-two symbols are arranged respectively. Each symbol column of video reel is constructed from the symbols including "FRANKENSTEIN", "BLUE7", "BELL", "APPLE", "CHERRY", "ORANGE" and "PLUM". And the symbols of predetermined types are arranged in a predetermined sequence. In other words, a symbol group is composed of each of the symbols of "FRANKENSTEIN", "BLUE7", "BELL", "APPLE", "CHERRY", "ORANGE" and "PLUM".

The wild symbol is displayed in each symbol display area of the symbol display frame 111 on the liquid crystal panel 5B, although the wild symbol is not drawn on the reel band of each video reel. The wild symbol can be substituted for each symbol of "FRANKENSTEIN", "BLUE 7", "BELL", "APPLE", "CHERRY", "ORANGE" and "PLUM".

Namely, a symbol group is made up by adding the wild symbol to each symbol of "FRANKENSTEIN", "BLUE7", "BELL", "APPLE", "CHERRY", "ORANGE" and "PLUM".

In this respect, each of the symbols of "FRANKENSTEIN", "BLUE7", "BELL", "APPLE", "CHERRY", "ORANGE" and "PLUM" is a scatter symbol. When more than nine or ten symbols of "FRANKENSTEIN", "BLUE7", "BELL", "APPLE", "CHERRY", "ORANGE" and "PLUM" are rearranged in the symbol display frame 111 of the liquid crystal panel 5B, a predetermined payout amount is awarded to a player (refer to FIG. 6). In this time, the wild symbol is treated as symbols of "FRANKENSTEIN", "BLUE7", "BELL", "APPLE", "CHERRY", "ORANGE" and "PLUM"

Incidentally, to each symbol composing the symbol column of each video reel shown in FIG. 3, a code number is allocated from top to down in sequence.

[4. Internal construction of the Slot Machine]

Next, an internal construction of the above slot machine 1 will be explained with reference to FIG. 4 and FIG. 5.

Figure 4:
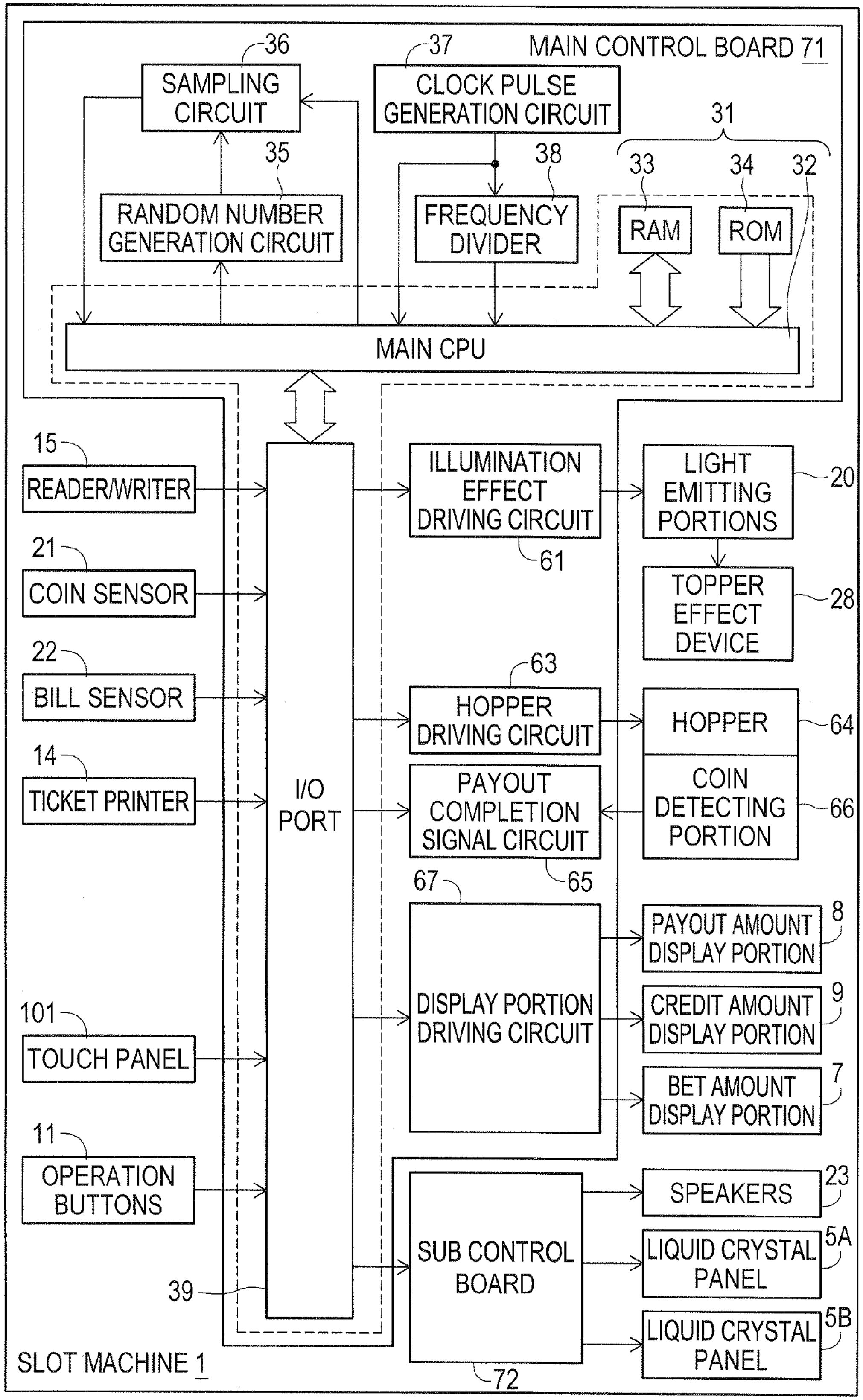
FIG. 4 is a block diagram showing an internal construction of entire slot machine.

FIG. 4 is a block diagram showing an internal construction of entire slot machine 1. As shown in FIG. 4, the slot machine 1 includes a plurality of construction elements such as a main control board 71, in which a microcomputer 31 is included. The main control board 71 is constructed from the microcomputer 31, a random number generation circuit 35, a sampling circuit 36, a clock pulse generation circuit 37 and a frequency divider 38. The main control board 71 also includes an illumination effect driving circuit 61, a hopper driving circuit 63, a payout completion signal circuit 65 and a display portion driving circuit 67.

The microcomputer 31 is constructed from a main CPU 32, a RAM 33 and a ROM 34. The main CPU 32 runs based on programs stored in the ROM 34, and inputs/outputs a signal with other elements through an I/O port 39, so as to execute control of the entire slot machine 1. Data and programs used when the main CPU 32 runs are stored in the RAM 33. For example, after-mentioned random numbers which are sampled by the sampling circuit 36 are stored temporarily after a start of a game, also the code numbers of the respective video reels and the symbol numbers are stored in the RAM 33. Further, the RAM 33 sets in advance a storage area where each of after-mentioned variables N, M, L and P are stored. Programs executed by the main CPU 32 and permanent data are stored in the ROM 34.

Especially, the programs stored in the ROM 34 include game programs and game system programs (abbreviated as "the game programs and the like" hereinafter). Further, a lottery programs mentioned below is also included in the game programs.

The lottery program is a program used to determine the code numbers of the respective video reels which corresponds to each symbol rearranged in the respective symbol display areas of the symbol display frame 111 on the liquid crystal panel 5B. Then, in the lottery program, it is included symbol weighing data corresponding to each of plural kinds of payout rates (for example, 80%, 84%, and 88%). The symbol weighing data are the data indicating correlation between the code number of each video reel and one or plural random numbers belonging to a predetermined number range (0 to 255), every each of the fifteen video reels. In other words, each of the code number of one video reel is associated with one or more random numbers corresponding to the payout rate. The random numbers are extracted by the lottery program, and symbols specified finally by the random numbers are rearranged in the respective symbol display areas of the symbol display frame 111 on the liquid crystal panel 5B.

Random numbers over a predetermined range are generated by the random number generation circuit 35, which is operated based on instructions from the main CPU 32. The random numbers are voluntarily extracted from the random numbers generated by the random number generation circuit 35 by the sampling circuit 36, based on instructions from the main CPU 32, and the extracted random numbers are input to the main CPU 32. The base clock for running the main CPU 32 is generated by the clock pulse generation circuit 37, and signals which are generated by dividing the base clock in a predetermined frequency are input to the main CPU 32 by the frequency divider 38.

And to the main control board 71, the touch panel 101 is connected. The touch panel 101 is arranged in front of the liquid crystal panel 5B, and specifies the coordinate position of the portion touched by a player. The position on which a player touched and the direction of the movement of the touched portion are determined based on the specified coordinate position information. A signal corresponding to the determination is input to the main CPU 32 through the I/O port 39.

Also, the operation buttons 11 for instructing an execution of a game are connected to the main control board 71. The operation buttons 11 include the spin button, the collecting button, the BET button and the like. A signal corresponding to the depressing of these buttons is input to the main CPU 32 through the I/O port 39.

A ticket printer 14, a reader/writer 15, a coin sensor 21 and a bill sensor 22 are connected to the main control board 71. The reader/writer 15 reads information from an IC card and writes information in an IC card. The ticket printer 14 prints tickets with bar codes. The bill sensor 22 detects a bill inserted to the bill slot 13 one by one and sends a signal corresponding to the detection to the main CPU 32 via the I/O port 39. The coin sensor 21 detects a coin inserted to the coin slot 12 one by one and sends a signal corresponding to the detection to the main CPU 32 via the I/O port 39.

An effect signal which is used to conduct illumination effect is output to the above-mentioned light emitting portions 20 and the topper effect device 28 by the illumination effect driving circuit 61. Then, the topper effect device 28 is serially connected to the illumination effect driving circuit 61 through the light emitting portions 20.

A hopper 64 is driven by the hopper driving circuit 63 based on control of main CPU 32. The hopper 64 executes payout of coins, and coins are paid out from the coin tray 16. Data of the number of coins are input from the connected coin detecting portion 66 by the payout completion signal circuit 65. When the number of coins becomes a predetermined number, a signal indicating completion of the coins is input to the main CPU 32. The number of the coins paid out from the hopper 64 is calculated by the coin detecting portion 66, and the data of the number calculated are input to the payout completion signal circuit 65. The each display operation of the bet amount display portion 7, payout amount display portion 8 and credit amount display portion 9 is controlled by the display portion driving circuit 67.

Furthermore, a sub control board 72 is connected to the main control board 71. The sub control board 72 is connected to the liquid crystal panel 5A, the liquid crystal panel 5B and the speakers 23.

Figure 5:
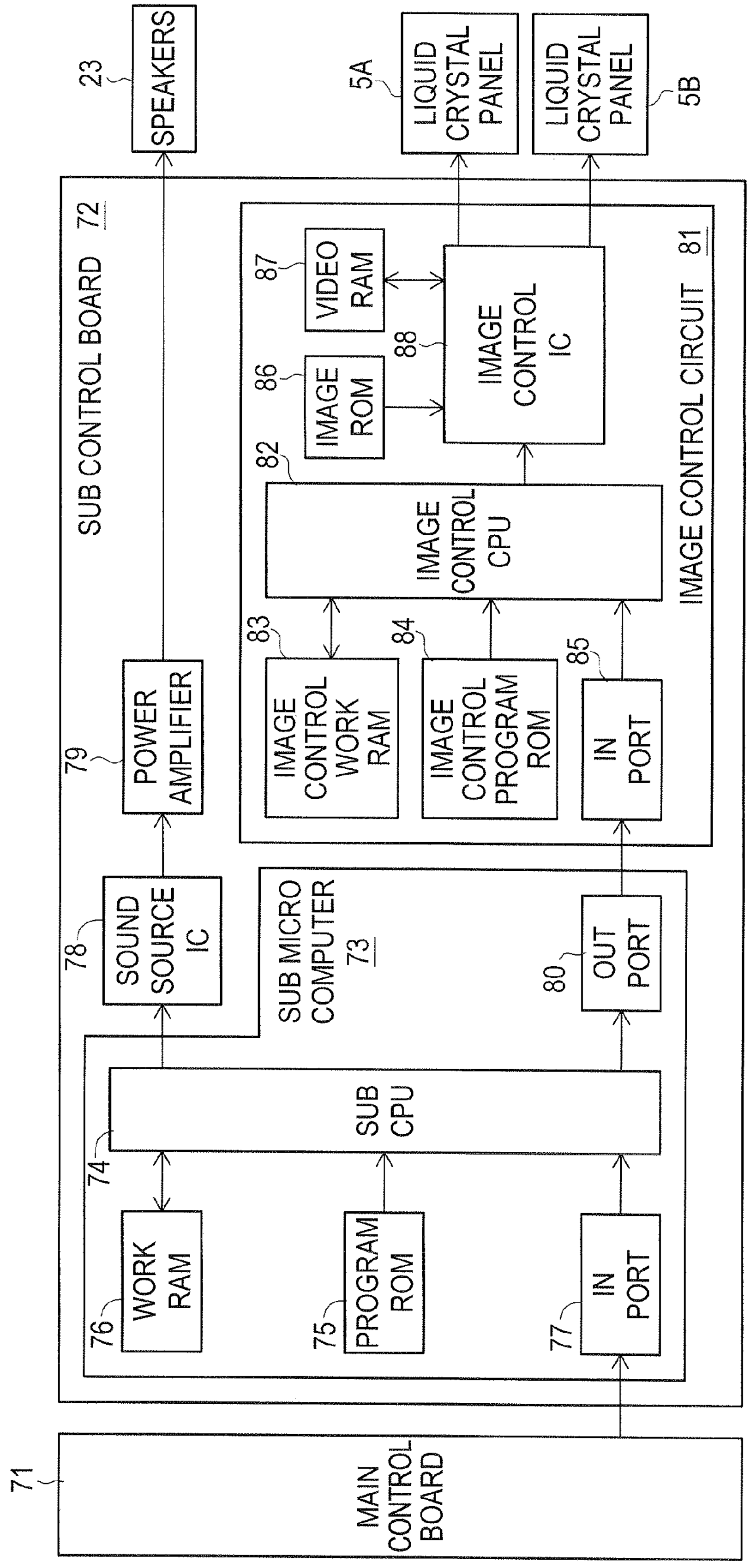
FIG. 5 is a block diagram showing an internal construction of a sub control board.

FIG. 5 is a block diagram showing an internal construction of the sub control board 72. As shown in FIG. 5, a command from the main control board 71 is input to the sub control board 72. The display control on the liquid crystal panel 5A of the upper display portion 4A and the liquid crystal panel 5B of the variable display portion 4B, and the sound output control on the speaker 23 are executed by the sub control board 72. The sub control board 72 is constructed on a circuit board different from the circuit board for the main control board 71, and includes a microcomputer 73 (abbreviated as "sub-microcomputer" hereinafter) as a main construction element, and a sound source IC 78, a power amplifier 79 and an image control circuit 81. The sound source IC 78 controls the sound output from the speakers 23, the power amplifier 79 is used as an amplification device, and the image control circuit 81 runs as a display control device of the liquid crystal panel 5A and 5B.

The sub-microcomputer 73 includes a sub CPU 74, a program ROM 75, a work RAM 76, an IN port 77 and an OUT port 80. The control operations are executed by the sub CPU 74 based on a control order sent from the main control board 71, the program ROM 75 is used as a memory device. Although a clock pulse generation circuit, a frequency divider, a random number generation circuit and a sampling circuit are not included in the sub control board 72, the sub control board 72 is constructed so as to execute random number sampling according to operation programs thereof. Control programs executed by the sub CPU 74 are stored in the program ROM 75. The work RAM 76 is constructed as a temporary storing device when the above control programs are executed by the sub CPU 74.

The image control circuit 81 includes an image control CPU 82, an image control work RAM 83, an image control program ROM 84, an IN port 85, an image ROM 86, a video RAM 87 and an image control IC 88. Images displayed on the liquid crystal panel 5A and 5B are determined by the image control CPU 82, based on parameters set by the sub-microcomputer 73, according to image control programs stored in the image control program ROM 84.

The image control programs regarding to a display of the liquid crystal panel 5A, 5B and a variety of selection tables are stored in the image control program ROM 84. The image control work RAM 83 is constructed as a temporary storing device when the image control programs are executed by the image control CPU 82. Images corresponding to contents determined by the image control CPU 82 are formed by the image control IC 88, and are output to the liquid crystal panel 5A, 5B.

In the image ROM 86, dot data used to form images are stored. Thus, it stores the dot data on symbols drawn on the reel band of the each video reel and the dot data on wild symbol. The video RAM 87 runs as a temporary storing device when the images are formed by the image control IC 88.

Further, based on a control signal from the main CPU 32, the image control circuit 81 performs display control of scrolling display/stop display of the video reels in the respective symbol display areas of the symbol display frame 111 on the liquid crystal panel 5B. In addition, based on a control signal from the main CPU 32, the image control circuit 81 executes display control to display the symbols shiftily and fixedly in each symbol display area of the symbol display frame 111 on the liquid crystal panel 5B.

[5. Outline of a Slot Game]

Figure 6:
FIG. 6 is a payout table in which winning combinations and the payout amounts corresponding to the winning combinations are shown when a slot game or a free game is executed.
Figure 6:
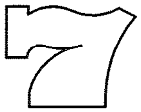
Figure 6:
Figure 6:
Figure 6:
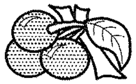
Figure 6:
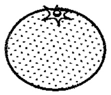
Figure 6:
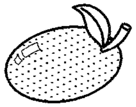

Next, winning combinations and the payout amounts corresponding to the winning combinations will be explained with reference to FIG. 6, wherein the winning combinations are symbol combinations when a slot game or a free game is executed by using each of the video reels in the slot machine 1 according to the present embodiment. FIG. 6 is a payout table in which the winning combinations and the payout amounts corresponding to the winning combinations are shown when a slot game or a free game is executed by using each of the video reels.

Here, the payout amount shown in FIG. 6 indicates the payout amount when the bet amount is "1". Therefore, when the bet amount is "1", the payout amount shown in FIG. 6 is paid out, and when the bet amount is more than "2", the payout amount obtained by multiplying the payout amount shown in FIG. 6 with the bet amount is paid out.

Therefore, when fifteen symbols of "FRANKENSTEIN" are rearranged in the symbol display frame 111 of the liquid crystal panel 5B, an amount obtained by multiplying 500 credits by the bet amount is paid out. Further, if the fourteen symbols of "FRANKENSTEIN" are rearranged in the symbol display frame 111 of the liquid crystal panel 5B, an amount obtained by multiplying 300 credits by the bet amount is paid out. In the following, similarly, according to the number of the symbols of "FRANKENSTEIN" rearranged in the symbol display frame 111 of the liquid crystal panel 5B, the payout amounts as shown in FIG. 6 are set.

Also for each symbol of "BLUE7", "BELL", "APPLE", "CHERRY", and "PLUM", similarly in the following, the payout amounts as shown in FIG. 6 are set according to the number of same symbols rearranged in the symbol display frame 111 of the liquid crystal panel 5B. However, if the number of same symbols rearranged in the symbol display frame 111 of the liquid crystal panel 5B is not any of the numbers shown in FIG. 6, it means a loss, and no payout is made to a loss.

In addition, each symbol of "FRANKENSTEIN", "BLUE 7", "BELL", "APPLE", "CHERRY", "ORANGE" and "PLUM" is also a trigger symbol. When three or more same symbols are rearranged on any line of the symbol display areas in the symbol display frame 111 of the liquid crystal panel 5B continuously from the leftmost symbol display area during a slot game, a player wins a bonus game trigger and a predetermined payout amount (for example, an amount obtained by multiplying 100 credits by the bet amount) is awarded to the player and the slot game is shifted from the slot game to a free game.

As mentioned above, in the slot machine 1 according to the present embodiment, a slot game is executed.

In other words, in a slot game, the slot game is executed by rearranging the plurality of same symbols specified by fifteen video reels in the symbol display frame 111 of the liquid crystal panel 5B. In the slot game, firstly, a part of symbol column (one symbol) drawn on the reel band of each video reel (shown in FIG. 3), is arranged in each symbol display area of the symbol display frame 111 on the liquid crystal panel 5B (refer to FIG. 7). Here, after a player sets the bet amount by depressing the BET button among the operation buttons 11, if the player depresses the spin button among the operation buttons 11, each of the video reels rotates, the symbol column drawn on the reel band of each video reel shown in FIG. 3, is scrolled from up to down in the symbol display frame 111 of the liquid crystal panel 5B (refer to FIG. 8).

After a predetermined time, each of the video reels stops automatically, a part of symbol column (one symbol) drawn on the reel band of each video reel shown in FIG. 3, is rearranged in each symbol display area of the symbol display frame 111 on the liquid crystal panel 5B (refer to FIG. 7). On the other hand, each winning combination based on each the number of the same symbol is determined beforehand (refer to FIG. 6). When a symbol combination constructed from the fifteen symbols rearranged in the symbol display frame 111 of the liquid crystal panel 5B, realizes a winning combination specified by the number of the same symbol, the payout amount obtained by multiplying the bet amount with the payout amount corresponding to the realized winning combination is awarded to the player.

On the other hand, a free game, in which a slot game same as above is repeated the first predetermined number of times (ten times, in the embodiment), is executed upon the player's winning a bonus game trigger in a slot game. Also, in the slot game, firstly, a part of symbol column (one symbol) drawn on the reel band of each video reel shown in FIG. 3, is arranged in the symbol display area of the symbol display frame 111 on the liquid crystal panel 5B. However, here, after a predetermined time, each of the video reels rotates automatically. Thereby, no matter whether a player presses the operation buttons 11 such as the BET button or the spin button, the symbol column drawn on the reel band of each video reel shown in FIG. 3, is scrolled from up to down in the symbol display frame 111 of the liquid crystal panel 5B.

Furthermore, after a predetermined time, each of the video reels stops automatically, so a part of symbol column (one symbol) drawn on the reel band of each video reel shown in FIG. 3 is rearranged in the symbol display area of the symbol display frame 111 on the liquid crystal panel 5B.

However, as described above, the wild symbols are fixedly displayed in some symbol display areas of the symbol display frame 111 on the liquid crystal panel 5B during the free game (refer to each liquid crystal panel 5B shown on both sides in the middle stage and the lower stage of FIG. 9). Therefore, the video reel is repeatedly displayed by a scrolling manner and by a stopped manner, as described above, only in the symbol display areas where no wild symbol is displayed (refer to the liquid crystal panel 5B shown on the left side in the middle stage of FIG. 9).

On the other hand, similar to the above slot game, each winning combination based on each the number of the same symbol is determined beforehand (refer to FIG. 6). When a symbol combination constructed from the fifteen symbols in the symbol display frame 111 of the liquid crystal panel 5B, realizes a winning combination specified by the number of the same symbol, the payout amount obtained by multiplying the bet amount with the payout amount corresponding to the realized winning combination is awarded to the player.

[6. Outline of a Chance Game]

Incidentally, even if a player wins the bonus game trigger during the free game, a new bonus game is not started. However, when the free game is finished, a chance game for determining whether or not the free game is executed again is executed (refer to FIG. 1 above). In a chance game, if the number of the re-trigger symbols that are being rearranged in the symbol display frame 111 of the liquid crystal panel 5B is a predetermined number or more, it is determined that the free game is executed again. In the determination, the number of times of executing the unit game of the free game which is determined to be executed again is determined according to the number of the re-trigger symbols.

Figure 10:
FIG. 10 is a view showing a table of the number of game execution times which is used for executing a chance game.

FIG. 10 shows a table of the number of game execution times which is used for executing a chance game. With reference to FIG. 10, the re-trigger symbol is only the symbol of "FRANKENSTEIN". In a chance game, if the number of the symbols of "FRANKENSTEIN" in the symbol display frame 111 of the liquid crystal panel 5B is eleven or more, it is determined that the free game is executed again.

If the number of the symbols of "FRANKENSTEIN" in the symbol display frame 111 of the liquid crystal panel 5B is fifteen, it is determined that the number of times of executing the unit game of the free game that is determined to be executed again is five. If the number of the symbols of "FRANKENSTEIN" in the symbol display frame 111 of the liquid crystal panel 5B is fourteen, it is determined that the number of times of executing the unit game of the free game that is determined to be executed again is four. Similarly in the following, the number of times of executing is set as shown in FIG. 10 according to the number of the symbols of "FRANKENSTEIN" in the symbol display frame 111 of the liquid crystal panel 5B.

[7. Operation of the Slot Machine]

Figure 11:
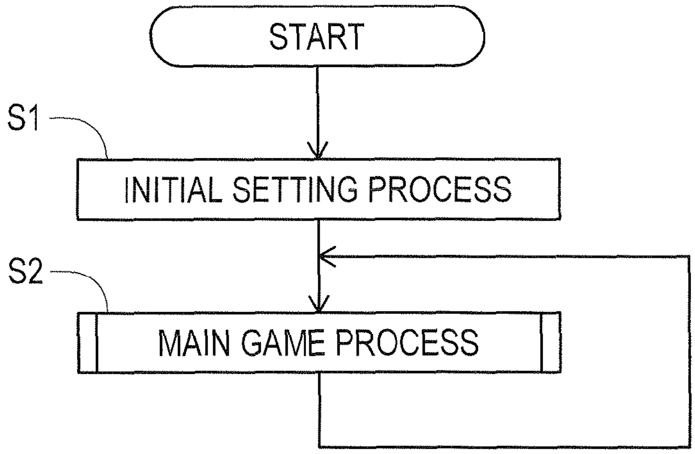
FIG. 11 is a flowchart of a main control program.

Next, a main control program executed in the slot machine 1 according to the present embodiment will be explained with reference to drawings. FIG. 11 is a flowchart of the main control program.

First, when a power switch is pressed (power activation), the microcomputer 31 is started to operate, an initial setting process is executed by the microcomputer 31 in step (abbreviated as "S") 1. In the initial setting process, BIOS stored in the ROM 34 is executed by the main CPU 32. Compressed data included in the BIOS are expanded to the RAM 33, and when the BIOS expansion to the RAM 33 is executed, a diagnosing process and initialization process of various peripheral devices are executed. Also, the game programs and the like are written from the ROM 34 to the RAM 33 by the main CPU 32, so as to obtain the payout rate setting data and country ID information. Also, during execution of the initial setting process, a verification process to each program is executed.

Then in S2, the main CPU 32 reads out the game programs and the like from the RAM 33, and executes the programs in sequence so as to conduct the main game process. A game is executed in the slot machine 1 according to the present embodiment by executing the main game process. Then, the main game process is repeated when the power is supplied to the slot machine 1.

Figure 12:
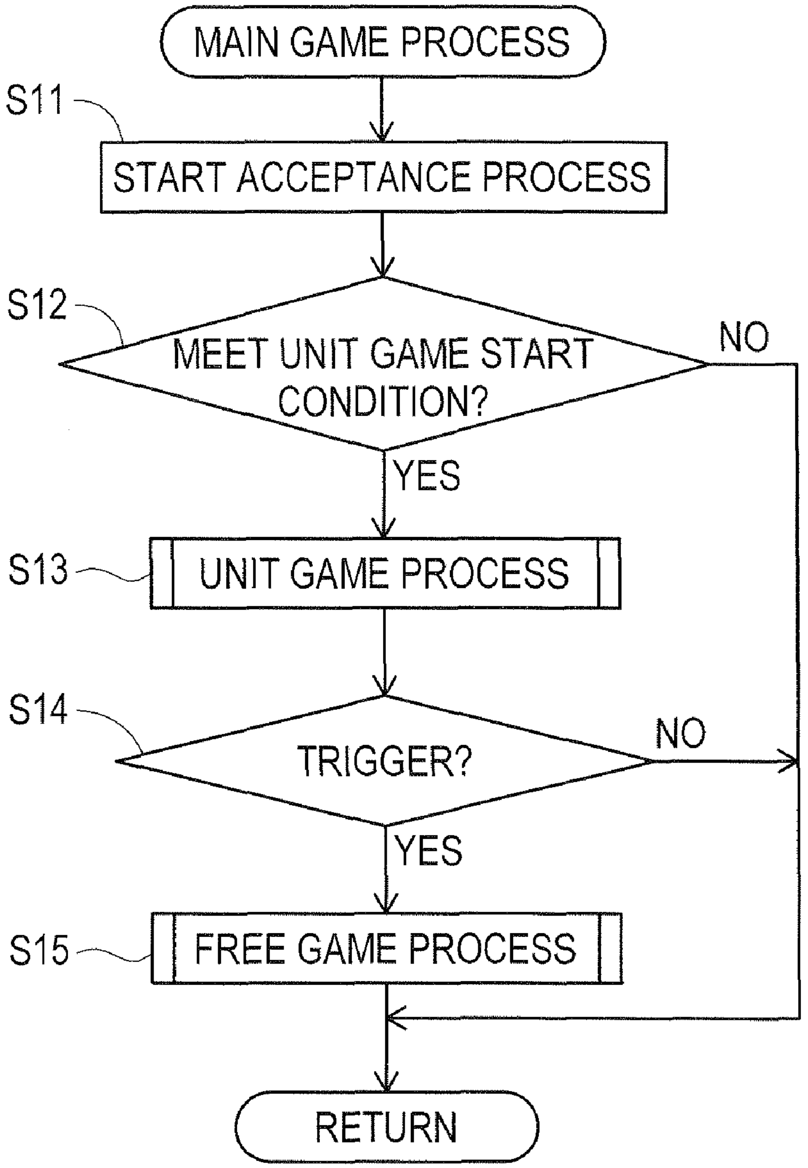
FIG. 12 is a flowchart of a main game process program.

Next, a sub process of the main game process in S2 above will be explained with reference to FIG. 12. FIG. 12 is a flowchart of the main game process program in the slot machine 1 according to the present embodiment. Incidentally, each program shown in the flowchart of FIG. 12 is stored in the ROM 34 or the RAM 33 of the slot machine 1, and is executed by the main CPU 32.

First, as shown in FIG. 12, a start acceptance process is executed by the main CPU 32. At this time, in the start acceptance process, an insertion of coins or a bet operation using the BET button among the operation buttons 11 is executed by a player.

Then, in S12, the main CPU 32 determines whether or not unit game start conditions are met. Here, the unit game start conditions are that the spin button among the operation buttons 11 is depressed. Accordingly, this determination is made based on a signal which is input to the main CPU 32 depending on depressing the operation buttons 11. At this point, if the spin button among the operation buttons 11 is not depressed (S12: NO), the process returns to the start acceptance process (S11) again. Thereby, an operation of changing the bet amount and the like are possible. In contrast, if the spin button among the operation buttons 11 is depressed (S12: YES), the bet amount set based on the above bet operation is reduced from the credit amount owned by the player at the moment, and is stored in the RAM 33 as bet information. Incidentally, the credit amount after the reduction is also stored in the RAM 33 as credit information. Then, by sending a control signal to the display portion driving circuit 67, the main CPU 32 displays the credit information stored in the RAM 33 (the credit amount after the above reduction) on the credit amount display portion 9 of the liquid crystal panel 5B.

Figure 13:
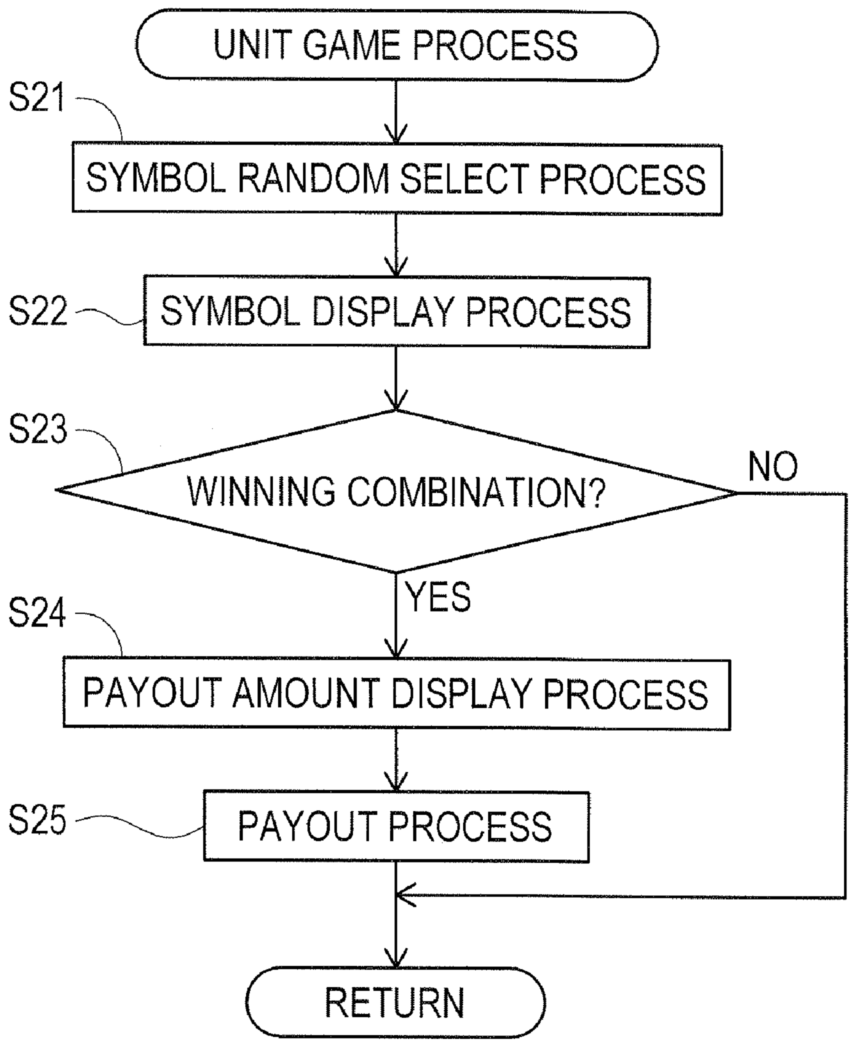
FIG. 13 is a flowchart of a unit game process program.

Then, when the process proceeds to S13, the main CPU 32 executes a unit game process. So, a sub process of the unit game process will be explained based on FIG. 13. FIG. 13 is a flowchart of the sub process of the unit game process program in the slot machine 1 according to the present embodiment. Incidentally, a program shown in the flowchart of FIG. 13 is stored in the ROM 34 or the RAM 33 of the slot machine 1, and is executed by the main CPU 32.

First, in the unit game process of S13 above, as shown in FIG. 13, the main CPU 32 executes a symbol random select process in S21. Specifically, when the lottery program included in the game programs is executed by the main CPU 32, the random number corresponding to each video reel respectively is selected from a range of "0 to 255". Then, with reference to the symbol weighting data corresponding to the payout rate setting data, based on the fifteen random numbers, the code number of each video reel is determined by the main CPU 32. The main CPU 32 stores the determined code number of each video reel in the RAM 33 by overwriting code number information in the RAM 33 with the determined code number of each video reel so as to correspond to each symbol display area of the symbol display frame 111 on the liquid crystal panel 5B. Thereafter, the process proceeds to S22.

Here, the code number of each video reel is associated with the symbol number to be rearranged in each symbol display area of the symbol display frame 111 on the liquid crystal panel 5B, so each symbol to be rearranged in such game is determined by overwriting the code number information in the RAM 33 with the code number of each video reel determined by the main CPU 32 so as to correspond to each symbol display area of the symbol display frame 111 on the liquid crystal panel 5B. For example, if the main CPU 32 determines that all of the code number of each video reel are "21" and then overwrites the code number information in the RAM 33 with the code number of each video reel so as to correspond to each symbol display area of the symbol display frame 111 on the liquid crystal panel 5B, the main CPU 32 determines to rearrange the fifteen symbols of "FRANKENSTEIN" (refer to FIG. 3). Thus, by overwriting the code number information in the RAM 33 with the code number of each video reel selected by a lottery so as to correspond to each symbol display area of the symbol display frame 111 on the liquid crystal panel 5B, each symbol to be rearranged in a unit game of a slot game is determined.

Subsequently, when proceeding to S22, the main CPU 32 executes a symbol display process. In other words, by sending a control signal to the sub control board 72, the main CPU 32 starts a scrolling display of each video reel in each symbol display area of the symbol display frame 111 on the liquid crystal panel 5B. After that, an effect mode (a display mode of images on the liquid crystal panel 5B and a sound output mode from the speakers 23) for each unit game is determined by the main CPU 32, and the sub control board 72 is ordered to start the effect in a predetermined effect pattern. Then, when a predetermined timing to stop displaying each video reel in scrolling manner comes, the main CPU 32, by sending a control signal to the sub control board 72, stops scrolling of each video reel being displayed. The stop operation is based on the code number stored in the RAM 33 by overwriting the code number information in the RAM 33 with the code number so as to correspond to each symbol display area of the symbol display frame 111 on the liquid crystal panel 5B. With this, each symbol which determined in S21 above-mentioned is rearranged in each symbol display area of the symbol display frame 111 on the liquid crystal panel 5B.

After that, when proceeding to S23, the main CPU 32 determines whether or not there is a winning combination. The determination is made based on the code number stored in the RAM 33 by overwriting the code number information in the RAM 33 with the code number so as to correspond to each symbol display area of the symbol display frame 111 on the liquid crystal panel 5B. At this point, if there is not a winning combination (S23: NO), the process returns to the above-mentioned main game process of FIG. 12. In contrast, if there is a winning combination (S23: YES), the process proceeds to S24.

In S24, the main CPU 32 executes a payout amount display process. Specifically, first, the payout amount obtained by multiplying the payout amount corresponding to the winning combination (the number of the same symbol) rearranged in the symbol display frame 111 of the liquid crystal panel 5B with the bet amount is computed. Incidentally, the computation is executed based on the bet information in the RAM 33 and the payout table of FIG. 6. In case that there is more than one payout amount corresponding to the winning combination (the number of the same symbol), the computation is executed by adding up these payout amounts. The computed payout amount is stored in RAM 33 as payout information. After that, by sending a control signal to the display portion driving circuit 67, the main CPU 32 displays the payout information stored in the RAM 33 (the above-mentioned computed amount) on the payout amount display portion 8 of the liquid crystal panel 5B.

Then, the main CPU 32 executes a payout process in S25. In the payout process, the payout amount awarded to a player in a slot game is paid out to the player based on the payout information stored in the RAM 33.

When the pay out is executed, the credit amount stored in the RAM 33 as the payout information (the payout amount awarded to a player in a slot game) are added to the credit amount stored in the RAM 33 as the credit information, and the added value is overwritten in the RAM 33 as the credit information. After that, by sending a control signal to the display portion driving circuit 67, the main CPU 32 displays the credit information stored in the RAM 33 (the added value computed in S25) on the credit amount display portion 9 of the liquid crystal panel 5B. At the same time, the main CPU 32 overwrites “0” to the RAM 33 as the payout information, and displays “0” on the payout amount display portion 8 of the liquid crystal panel 5B by sending a control signal to the display portion driving circuit 67.

Incidentally, in the payout process, the credit amount owned by a player at the moment may be paid out by coins corresponding to the credit amount (one credit equals to one coin) based on the player’s depressing the CASHOUT button among the operation buttons 11, or may also be paid out by a ticket with a bar code which is printed by the ticket printer 14.

Then, after the main CPU 32 executes the above-mentioned payout process in S25, the process returns to the above-mentioned main game process of FIG. 12.

Returns to the above-mentioned FIG. 12, in S14, the main CPU 32 determines whether or not a player wins a bonus game trigger. If the above-described “trigger combination” is realized, it is determined that a player wins a bonus game trigger. Specifically, when three or more symbols of any one kind of the symbols of “FRANKENSTEIN”, “BLUE 7”, “BELL”, “APPLE”, “CHERRY”, “ORANGE” and “PLUM” are rearranged on any line of the symbol display areas in the symbol display frame 111 of the liquid crystal panel 5B continuously from the leftmost symbol display area, it is determined that a player wins a bonus game trigger.

Incidentally, the determination also is made based on the code number stored in the RAM 33 by overwriting the code number information in the RAM 33 with the code number so as to correspond to each symbol display area of the symbol display frame 111 on the liquid crystal panel 5B. At this point, if a player wins no bonus game trigger (S14: NO), the process returns to the start acceptance process (S11) again. In contrast, if a player wins a bonus game trigger (S14: YES), the process returns to the start acceptance process (S11) again via an after-mentioned free game process in S15.

Figure 14:
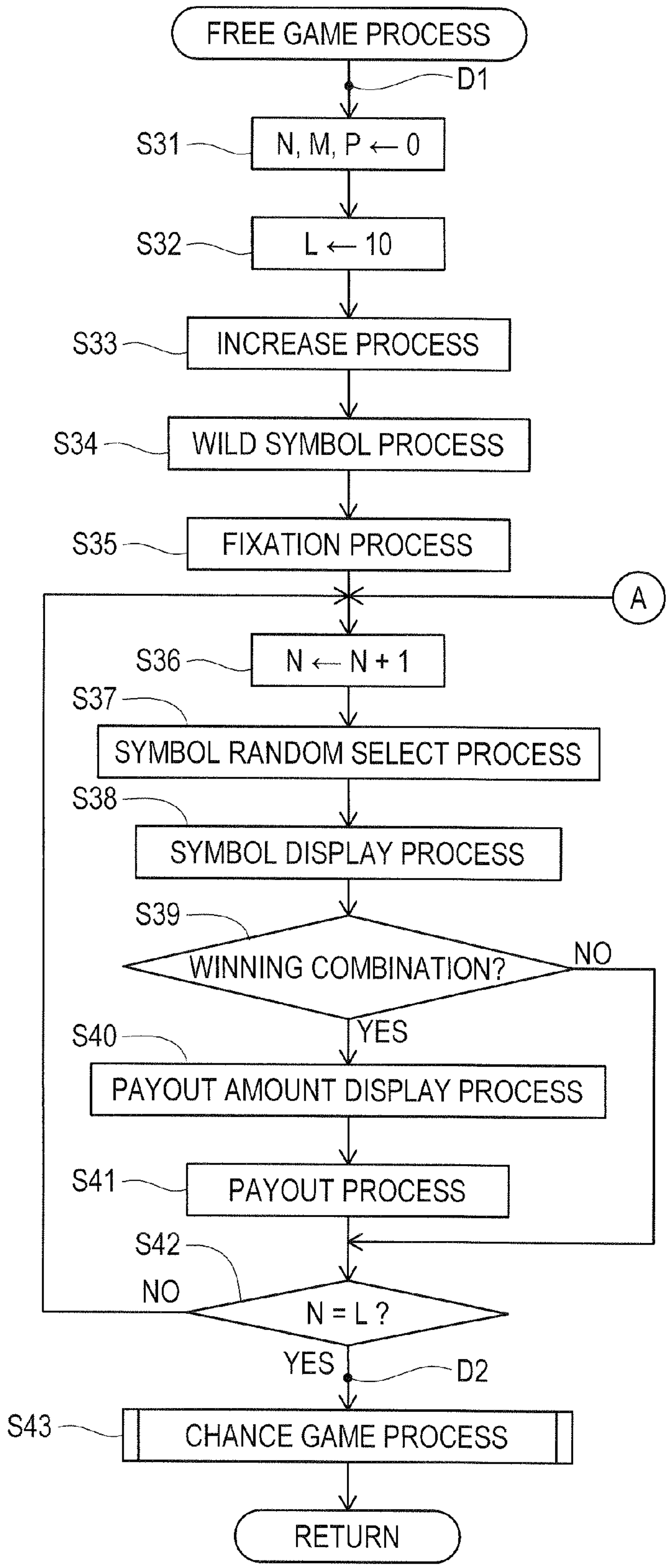
FIG. 14 is a flowchart of a free game process program.

Next, a sub process of the free game process in S15 above will be explained based on the drawings. FIG. 14 is a flowchart of the sub process of the free game process program in the slot machine 1 according to the present embodiment. Incidentally, a program shown in the flowchart of FIG. 14 is stored in the ROM 34 or the RAM 33 of the slot machine 1, and is executed by the main CPU 32.

First, in the free game process of S15 above, as shown in FIG. 14, the main CPU 32 sets “0” to the variable N, the variable M and the variable P that are stored in the RAM 33 in S31. In S32, the main CPU 32 sets “10” to the variable L which is stored in the RAM 33.

Next, in S33, the main CPU 32 executes an increase process. In this process, the “trigger combination” which is being rearranged on any line of the symbol display areas in the symbol display frame 111 of the liquid crystal panel 5B is displayed on all the lines of the symbol display areas other than the line where the “trigger combination” is being rearranged from the leftmost symbol display area (refer to each liquid crystal panel 5B shown on both sides in the upper stage of FIG. 9). The main CPU 32 executes control of this display by sending a control signal to the sub control board 72.

However, the line where the “trigger combination” is displayed in the symbol display frame 111 of the liquid crystal panel 5B by the increase process may be a part of the lines other than the lines where the “trigger combination” is being rearranged.

In S34, the main CPU 32 executes a wild symbol process. In this process, in the symbol display frame 111 of the liquid crystal panel 5B, each symbol of the “trigger combination” which is being rearranged and each symbol of the “trigger combination” which is being displayed are changed to the wild symbol, and the wild symbols are displayed, respectively (refer to the liquid crystal panel 5B shown on the right side in the middle stage of FIG. 9). Also, the main CPU 32 executes control of this display by sending a control signal to the sub control board 72.

Further, in S35, the main CPU 32 executes a fixation process. In this process, all the wild symbols that are being displayed in the symbol display frame 111 of the liquid crystal panel 5B will be continuously displayed during the free game. In other words, in the symbol display frame 111 of the liquid crystal panel 5B during the free game, the video reel is repeatedly displayed by a scrolling manner and by a stopped manner only in the symbol display areas where no wild symbol is displayed (refer to the liquid crystal panel 5B shown on left side in the middle stage of FIG. 9).

Also, the main CPU 32 executes control of this display by sending a control signal to the sub control board 72.

The main CPU 32 keeps storing the code numbers of the wild symbols over the code number information in the RAM 33 so as to correspond to the symbol display areas where the wild symbols are being displayed as long as the wild symbols are displayed.

Next, the main CPU 32 increments the variable N in S36. Then, the main CPU 32 executes a symbol random select process of S37 and a symbol display process of S38. In this respect, the symbol random select process of S37 is same as the above symbol random select process of S21 except for that the symbol random select process of S37 is executed only for the symbol display areas where no wild symbol is displayed. The symbol display process of S38 is same as the above symbol display process of S22 except for that the symbol display process of S38 is executed only for the symbol display areas where no wild symbol is displayed. Therefore, explanation of each of the processes is omitted.

In S39, the main CPU 32 determines whether or not there is a winning combination. This determination is made based on a code number which is overwritten to code number information stored corresponding to each symbol display area of the symbol display frame 111 of the liquid crystal panel 5B in the RAM 33 and the like. At this point, if there is not a winning combination (S39: NO), the process proceeds to S42 below. In contrast, if there is a winning combination (S39: YES), the main CPU 32 executes a payout amount display process of S40 and a payout process of S41. In this respect, the payout amount display process of S40 is same as the payout amount display process of S24 above. The payout process of S41 is same as the payout process of S25 above. Therefore, explanation of each process will be omitted.

Thereafter, the process proceeds to S42.

The main CPU 32 determines whether or not the variable N is equal to the variable L in S42. At this point, if the variable N is not equal to the variable L (S42: NO), the process returns to S36 above. In contrast, if the variable N is equal to the variable L (S42: YES), the process proceeds to S43. Accordingly, a slot game is repeated for the number of times that is equal to the variable L during the free game. When the process proceeds to S43, the main CPU 32 stores data displayed in the symbol display frame 111 of the liquid display panel 5B in the sub control board 72 as displayed data information.

When the process proceeds to S43, the main CPU 32 executes a chance game process. So, a sub process of the chance game process will be explained based on FIG. 15.

Figure 15:
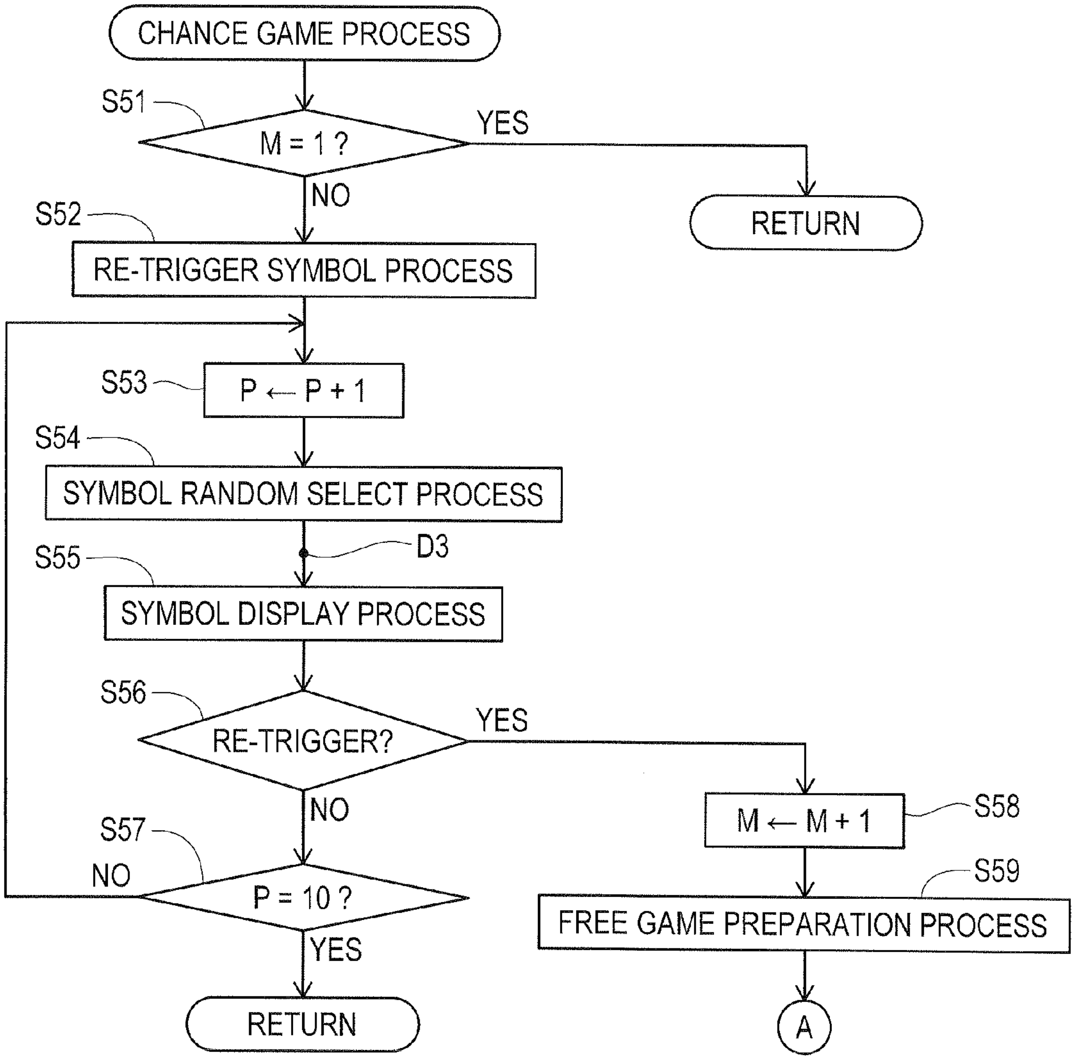
FIG. 15 is a flowchart of a chance game process program.

FIG. 15 is a flowchart of the sub process of the chance game process program in the slot machine 1 according to the present embodiment. Incidentally, a program shown in the flowchart of FIG. 15 is stored in the ROM 34 or the RAM 33 of the slot machine 1, and is executed by the main CPU 32.

In the chance game process of S43 above, first, the main CPU 32 determines whether or not the variable M is "1" in S51, as shown in FIG. 15. At this point, if the variable M is "1" (S51: YES), the process returns to the main game process of FIG. 12 above. Accordingly, the number of times that the free game is shifted to a chance game is limited to one. In contrast, if the variable M is not "1" (S51: NO), the process proceeds to S52.

The main CPU 32 executes a re-trigger symbol process in S52. In this process, all the wild symbols being displayed in the symbol display frame 111 of the liquid crystal panel 5B are changed to the re-trigger symbols (the symbols of "FRANKENSTEIN" in the present embodiment), and the re-trigger symbols are displayed (refer to the liquid crystal panel 5B shown on both sides in the upper stage of FIG. 1). Also, the main CPU 32 executes control of this display by sending a control signal to the sub control board 72.

In this time, the main CPU 32 keeps storing the code numbers of the re-trigger symbols over the code number information in the RAM 33 so as to correspond to the symbol display area where the re-trigger symbol is being displayed as long as the re-trigger symbols are displayed.

The main CPU 32 increments the variable P in S53. Then, the main CPU 32 executes a symbol random select process of S54 and a symbol display process of S55. In this respect, the symbol random select process of S54 is same as the symbol random select process of S21 above except for that the symbol random select process of S54 is executed only for the symbol display areas where no re-trigger symbol is displayed. The symbol display process of S55 is same as the symbol display process of S22 above except for that the symbol display process of S55 is executed only for the symbol display areas where no re-trigger symbol is displayed. Therefore, explanation of each process is omitted.

The main CPU 32 determines whether there is a re-trigger in S56. This determination is made based on the code number stored in the RAM 33 by overwriting the code number information in the RAM 33 with the code number so as to correspond to each symbol display area of the symbol display frame 111 on the liquid crystal panel 5B and based on the table of the number of times of executing a game of FIG. 10 above. Specifically, if there are eleven or more symbols of "FRANKENSTEIN" in the symbol display frame 111 of the liquid crystal panel 5B, it is determined that there is a re-trigger. At this point, if there is no re-trigger (S56: NO), the process proceeds to S57.

The main CPU 32 determines whether or not the variable P is "10" in S57. If the variable P is not "10" (S57: NO), the process returns to S53 above. In contrast, if the variable P is "10" (S57: YES), the process returns to the main game process of FIG. 12 above. Accordingly, the maximum number of times of repetitious executing a chance game is limited to ten.

If there is a re-trigger (S56: YES), the process proceeds from S56 above to S58. The main CPU 32 increments the variable M in S58.

Then, the main CPU 32 executes a free game preparation process of S59. In this process, the main CPU 32 sets the number of times of executing a game corresponding to the number of the re-trigger symbols in the symbol display frame 111 of the liquid crystal panel 5B to the variable L. This process is executed based on the code number stored in the RAM 33 by overwriting the code number information in the RAM 33 with the code number so as to correspond to each symbol display area of the symbol display frame 111 on the liquid crystal panel 5B and based on the table of the number of times of executing a game of FIG. 10 above.

Further, in the free game preparation process of S59, the main CPU 32 changes the data displayed in the symbol display frame 111 of the liquid crystal panel 5B to the data that has been displayed in S43 above. The main CPU 32 executes control of this display by sending a control signal based on the displayed data information stored in the sub control board 72 to the sub control board 72. Then, the process returns to S36 of the free game process of FIG. 14 above. With the above, the main control program is executed in the slot machine 1 according to the present embodiment.

[8. Others]

Incidentally, the present invention is not limited to the above embodiments, but various changes may be made without departing from its scope.

For example, it may be determined whether or not the free game is executed again when the base game is shifted to the free game.

Figure 16:
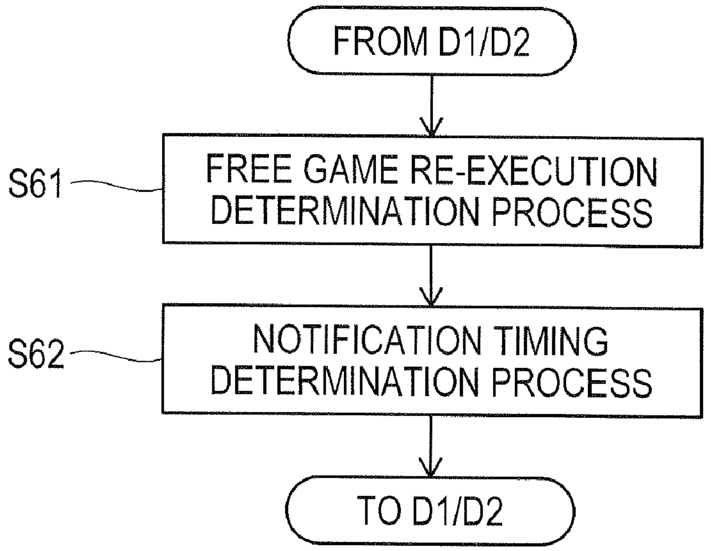
FIG. 16 is a flowchart of a free game process program.

In this case, for example, at a point in time D1 placed just before S31 of the free game process program shown in FIG. 14 above, the main CPU 32 executes a free game process program shown in FIG. 16. That is, when the main CPU 32 executes the free game process program, first, the main CPU 32 proceeds to S61 of FIG. 16 and executes a free game re-execution determination process. In this process, the main CPU 32 determines at random whether or not to execute the free game again. In this determination, for example, the main CPU 32 compares a random number that is sampled by the sampling circuit 36 with a predetermined table to determine whether or not to execute the free game again. A relationship between random numbers and determined results is defined in the table. Further, with respect to the random number for which the free game is determined to be executed again, the number of times of executing the unit game of the free game which is executed again is also defined in the determined result. Incidentally, this determined result is written over and stored in the RAM 33 as free game re-execution determination information. Then, the process proceeds to S62.

The CPU 32 executes a notification timing determination process in S62. In this process, the main CPU 32 determines the number of times of executing the chance game which notifies a player of executing the free game again, out of the maximum number of 10 times of repeating the chance game. In this determination, for example, the main CPU 32 compares a random number that is sampled by the sampling circuit 36 to a predetermined table and determines the number of times of executing the chance game which notifies a player of executing the free game again. The relationship between the random numbers and the determined results are defined in the table. Incidentally, the determined results are written over and stored in the RAM 33 as notification timing determination information. Then, the process proceeds to S31 of the free game process program shown in FIG. 14 above.

Figure 17:
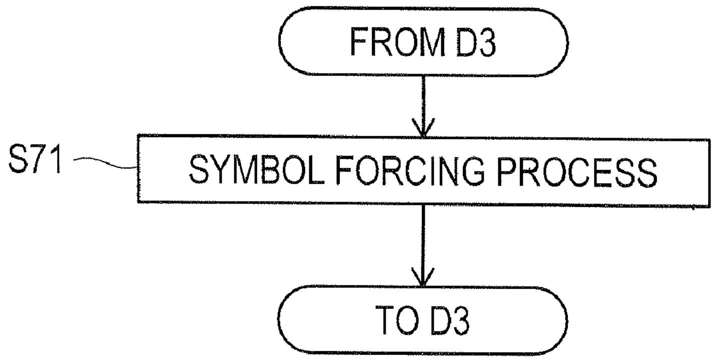
FIG. 17 is a flowchart of a chance game process program.

Further, at a point in time D3 placed between S54 and S55 of the chance game process program shown in FIG. 15 above, the main CPU 32 executes the chance game process program shown in FIG. 17. In other words, the main CPU 32 proceeds to S71 in FIG. 17 and executes a symbol forcing process after the main CPU 32 executes the symbol random process of S54 of the chance game process program shown in FIG. 15 above. In the symbol forcing process, the main CPU 32 rewrites the code number information in the RAM 33 so as to realize the determined results made in both S61 above and S62 above.

Then, the process proceeds to the symbol display process of S55 of the chance game process program shown in FIG. 15 above.

It may be determined whether or not the free game is executed again when the free game is finished. In this case, for example, the main CPU 32 executes the free game process program shown in FIG. 16 above at a point in time D2 placed between S42 and S43 of the free game process program shown in FIG. 14 above. Further, the main CPU 32 executes the chance game process program shown in FIG. 17 above at the point in time D3 placed between S54 and S55 of the chance game process program shown in FIG. 15 above.

In a free game, each symbol of the "trigger combination" in the symbol display frame 111 of the liquid crystal panel 5B is not changed to the wild symbol and may be fixedly displayed.

In this case, the main CPU 32 does not execute the wild symbol process of S34 of the free game process program shown in FIG. 14 above, and executes the fixation process of S35. Further, when the main CPU 32 executes the fixation process of S35 above, the main CPU 32 controls each symbol of the "trigger combination" that is being rearranged in the symbol display frame 111 of the liquid crystal panel 5B and each symbol of the "trigger combination" that is being displayed to be continuously displayed during the free game. In other words, in the symbol display frame 111 of the liquid crystal panel 5B during the free game, the video reel is repeatedly displayed by a scrolling manner and by a stopped manner only in the symbol display areas where each symbol of the "trigger combination" is not displayed.

Figure 18:
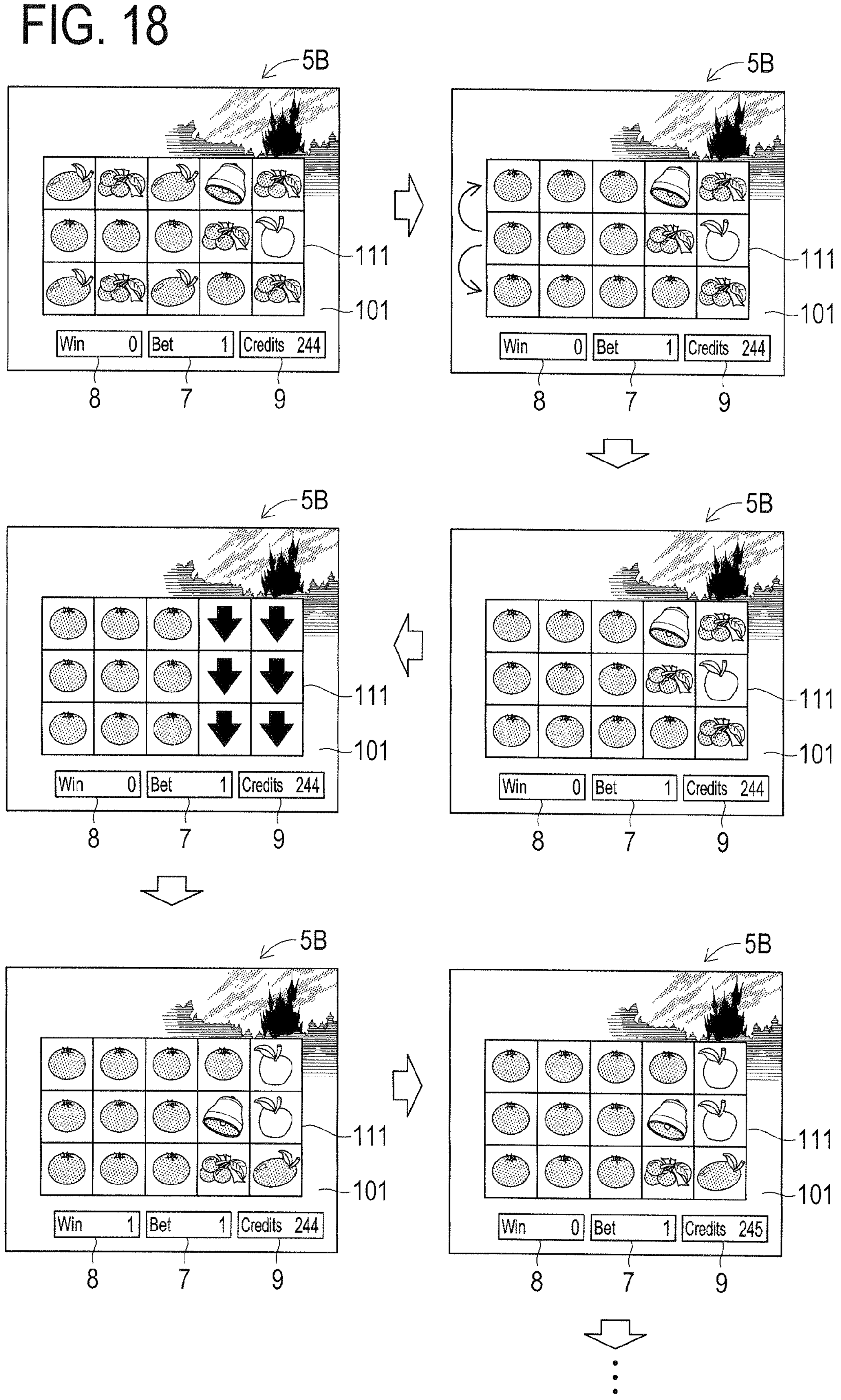
FIG. 18 is a view showing characteristics of a slot machine which is other embodiment of the present invention.

A specific example is shown in FIG. 18. When a game mode is shifted to such a free game, three or more same symbols are rearranged on any line of the symbol display areas in the symbol display frame 111 of the liquid crystal panel 5B continuously from the leftmost symbol display area. In the example shown on the liquid crystal panel 5B shown on the left side in the upper side of FIG. 18, three symbols of "ORANGE" are rearranged on the middle line of the symbol display areas in the symbol display frame 111 continuously from the leftmost symbol display area.

Then, as shown on the liquid crystal panel 5B shown on the right side in the upper stage of FIG. 18, the combination of three symbols of "ORANGE" that are rearranged continuously from the leftmost symbol display area on the middle line in the symbol display frame 111 is also displayed on the upper line and the lower line in the symbol display frame 111 from the leftmost symbol display area.

Then, each of the three symbols of "ORANGE" that are rearranged on all the lines of the symbol display areas in the symbol display frame 111 of the liquid crystal panel 5B continuously from the leftmost symbol display area will be continuously displayed during the free game. With this state, each unit game of the free game is repeated. In other words, as shown on the liquid crystal panel 5B shown on both sides in the middle stage of FIG. 18, in the symbol display frame 111 of the liquid crystal panel 5B during the free game, the video reel is repeatedly displayed by a scrolling manner and by a stopped manner only in the symbol display areas where the symbol of "ORANGE" of the "trigger combination" is not displayed. Therefore, in each of the unit games of the free game, a plurality of same symbols, for example the symbols of "ORANGE" are necessarily rearranged in the symbol display frame 111 of the liquid crystal panel 5B.

In the example shown in FIG. 18, every time each unit game of the free game, the nine same symbols, for example the symbols of "ORANGE" are necessarily rearranged. Therefore, the winning combination of the symbols of "ORANGE" is likely to be realized. Specifically, in the example shown on the liquid crystal panel 5B shown on both sides in the lower stage of FIG. 18, one symbol of "ORANGE" is being rearranged in the symbol display frame 111. However, in this case, there are nine symbols of "ORANGE" that will be continuously displayed in the symbol display frame 111 of the liquid crystal panel 5B during the free game, so the winning combination comprising the ten symbols of "ORANGE" is realized (refer to FIG. 6 above).

What is claimed is:

1. A slot machine comprising:

a plurality of re-trigger symbols;

a plurality kinds of symbols including the re-trigger symbols;

a symbol group comprising the symbols;

a symbol matrix frame where one of the symbols is arranged on each point which is formed by crossing a plurality of horizontal lines and a plurality of vertical columns;

a display device for displaying the symbol matrix frame;

a unit game in which a prize is awarded to a player based on the symbol displayed in the symbol matrix frame on the display device;

a base game comprising each of the unit games;

a free game in which the unit game is repeated for a first number of times;

a chance game which is executed for determining whether or not the free game is executed again;

a processor programmed, for executing the free game, to execute each of processes from the process of (1) below to the process of (17) below:

(1) selecting some of the symbols from the symbol group at random and displaying by scrolling the symbols in the matrix frame along each of the column upon starting the unit game of the base game;

(2) displaying on the display device each of the symbols selected in the process of (1) above in a state that each symbol is rearranged on each point in the symbol matrix frame;

(3) shifting a game mode from the base game to the free game upon rearranging a number or more than the number of symbols of the same kind continuously on any line in the symbol matrix frame;

(4) arranging the number or more than the number of symbols of the same kind that are continuously rearranged on any lines in the symbol matrix frame on the lines different from the any lines in the symbol matrix frame continuously, and whereby increasing and rearranging symbols of the same kind, upon shifting the game mode to the free game;

(5) starting to repeat the unit game of the free game for the first number of times on a condition that the number or more than the number of symbols of the same kind on any lines in the symbol matrix frame are fixedly maintained;

(6) selecting some of the symbols from the symbol group at random upon starting the current unit game in the free game;

(7) displaying on the display device a state that each of the symbols selected in the process of (6) above is being rearranged on each point in the symbol matrix frame different from the points where the same kinds of symbols are fixed;

(8) awarding a player a prize which corresponded to both a total number of the number of the same kinds of symbols being fixed in the symbol matrix frame and the number of the same kinds of symbols rearranged in the symbol matrix frame, and finishing the current unit game in the free game;

(9) determining whether or not the unit game of the free game is repeated continuously for the first number of times;

(10) when it is determined that the unit game of the free game is not repeated continuously for the first number of times, starting a new unit game in the free game and returning to the process of (6) above;

(11) when the unit game of the free game is repeated continuously for the first number of times, starting to repeat the chance game for a second number of times on a condition that the re-trigger symbols in the symbol matrix frame are fixedly maintained;

(12) displaying on the display device a state that each symbol is being rearranged on each point different from the points where the re-trigger symbols are fixed in the symbol matrix frame upon starting the chance game;

(13) notifying, by both a total number of the number of the re-trigger symbols that are being fixed in the symbol matrix frame and the number of the re-trigger symbols that are being rearranged in the symbol matrix frame, that the free game is continued or that the free game is not continued;

(14) executing the free game again when it is notified that the free game is continued;

(15) determining whether or not the chance game is repeated for the second number of times when it is notified that the free game is not continued;

(16) when it is determined that the chance game is not repeated continuously for the second number of times, starting the chance game newly and returning to the process of (12) above; and

(17) when it is determined that the chance game is repeated continuously for the second number of times, finishing the free game and shifting the game mode from the free game to the base game.

2. The slot machine according to claim 1, wherein the processor is programmed, for executing the chance game, to execute each of processes from the process of (18) below to the process of (19) below:

(18) determining whether the free game is executed again in shifting the game mode from the base game to the free game at the process of (3) above; and

(19) in executing the process of (12) above, before the chance game is repeated continuously for the second number of times, selecting from the symbol group each symbol which is rearranged on each point different from the points where the re-trigger symbols are being fixed in the symbol matrix frame so as to realize a determination result of the process of (18) above.

3. The slot machine according to claim 1, wherein the processor is programmed for executing the chance game, to execute each of processes from the process of (20) below to the process of (21) below:

(20) when it is determined that the unit game of the free game is repeated continuously for the first number of times at the process of (3) above, determining whether or not the free game is executed again; and

(21) in executing the process of (12) above, before the chance game is repeated continuously for the second number of times, selecting from the symbol group each symbol which is rearranged on each point different from the points where the re-trigger symbols are being fixed in the symbol matrix frame so as to realize a determination result of the process of (20) above.

4. The slot machine according to claim 1, wherein the processor is programmed, for executing the chance game, to execute each of processes from the process of (22) below to the process of (23) below:

(22) every time the chance game is started in the process of (11) above or in the process of (16) above, determining whether or not the free game is executed again; and

(23) in executing the process of (12) above, selecting from the symbol group each symbol which is rearranged on each point different from the points where the re-trigger symbols are being fixed in the symbol matrix frame so as to realize a determination result of the process of (22) above.

5. A slot machine comprising:

a plurality of re-trigger symbols;

a plurality kinds of symbols including the re-trigger symbols;

a wild symbol included in the symbols and being able to be substituted for all kinds of symbols;

a symbol group comprising the symbols;

a symbol matrix frame where one of the symbols is arranged on each point which is formed by crossing a plurality of horizontal lines and a plurality of vertical columns;

a display device for displaying the symbol matrix frame;

a unit game in which a prize is awarded to a player based on the symbol displayed in the symbol matrix frame on the display device;

a base game comprising each of the unit games;

a free game in which the unit game is repeated for a first number of times;

a chance game which is executed for determining whether or not the free game is executed again;

a processor programmed, for executing the free game, to execute each of processes from the process of (1) below to the process of (17) below:

(1) selecting some of the symbols from the symbol group at random and displaying by scrolling the symbols in the matrix frame along each of the column upon starting the unit game of the base game;

(2) displaying on the display device each of the symbols selected in the process of (1) above in a state that each symbol is rearranged on each point in the symbol matrix frame;

(3) shifting a game mode from the base game to the free game upon rearranging a number or more than the number of symbols of the same kind continuously on any line in the symbol matrix frame;

(4) arranging the number or more than the number of symbols of the same kind that are continuously rearranged on any lines in the symbol matrix frame on the lines different from the any lines in the symbol matrix frame continuously, and whereby increasing and rearranging symbols of the same kind, upon shifting the game mode to the free game;

(5) replacing the number or more than the number of symbols of the same kind on any lines in the symbol matrix frame by the wild symbols, and starting to repeat the unit game of the free game for the first number of times on a condition that the wild symbols are fixedly maintained;

(6) selecting some of the symbols from the symbol group at random upon starting the current unit game in the free game;

(7) displaying on the display device a state that each of the symbols selected in the process of (6) above is being rearranged on each point in the symbol matrix frame different from the points where the wild symbols are fixed;

(8) awarding a player a prize which corresponded to both a total number of the number of the wild symbols being fixed in the symbol matrix frame and the number of the same kinds of symbols rearranged in the symbol matrix frame, and finishing the current unit game in the free game;

(9) determining whether or not the unit game of the free game is repeated continuously for the first number of times;

(10) when it is determined that the unit game of the free game is not repeated continuously for the first number of times, starting a new unit game in the free game and returning to the process of (6) above;

(11) when the unit game of the free game is repeated continuously for the first number of times, changing the wild symbols in the symbol matrix frame into the re-trigger symbols, and starting to repeat the chance game for a second number of times on a condition the re-trigger symbols are fixedly maintained;

(12) displaying on the display device a state that each symbol is being rearranged on each point different from the points where the re-trigger symbols are fixed in the symbol matrix frame upon starting the chance game;

(13) notifying, by both a total number of the number of the re-trigger symbols that are being fixed in the symbol matrix frame and the number of the re-trigger symbols that are being rearranged in the symbol matrix frame, that the free game is continued or that the free game is not continued;

(14) executing the free game again when it is notified that the free game is continued;

(15) determining whether or not the chance game is repeated for the second number of times when it is notified that the free game is not continued;

(16) when it is determined that the chance game is not repeated continuously for the second number of times, starting the chance game newly and returning to the process of (12) above; and

(17) when it is determined that the chance game is repeated continuously for the second number of times, finishing the free game and shifting the game mode from the free game to the base game.

6. The slot machine according to claim 5, wherein the processor is programmed, for executing the chance game, to execute each of processes from the process of (18) below to the process of (19) below:

(18) determining whether the free game is executed again in shifting the game mode from the base game to the free game at the process of (3) above; and

(19) in executing the process of (12) above, before the chance game is repeated continuously for the second number of times, selecting from the symbol group each symbol which is rearranged on each point different from the points where the re-trigger symbols are being fixed in the symbol matrix frame so as to realize a determination result of the process of (18) above.

7. The slot machine according to claim 5, wherein the processor is programmed for executing the chance game, to execute each of processes from the process of (20) below to the process of (21) below:

(20) when it is determined that the unit game of the free game is repeated continuously for the first number of times at the process of (3) above, determining whether or not the free game is executed again; and

(21) in executing the process of (12) above, before the chance game is repeated continuously for the second number of times, selecting from the symbol group each symbol which is rearranged on each point different from the points where the re-trigger symbols are being fixed in the symbol matrix frame so as to realize a determination result of the process of (20) above.

8. The slot machine according to claim 5, wherein the processor is programmed, for executing the chance game, to execute each of processes from the process of (22) below to the process of (23) below:

(22) every time the chance game is started in the process of (11) above or in the process of (16) above, determining whether or not the free game is executed again; and

(23) in executing the process of (12) above, selecting from the symbol group each symbol which is rearranged on each point different from the points where the re-trigger symbols are being fixed in the symbol matrix frame so as to realize a determination result of the process of (22) above.

* * * * *